United States Patent
Madapushi et al.

(10) Patent No.: US 7,457,319 B2
(45) Date of Patent: Nov. 25, 2008

(54) DATA PARTITION METHOD TO MAXIMIZE BLUETOOTH BASEBAND THROUGHPUT

(75) Inventors: Thejaswi Bharadwaj Madapushi, Santa Clara, CA (US); Andrew Sendonaris, San Jose, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 967 days.

(21) Appl. No.: 10/295,306

(22) Filed: Nov. 15, 2002

(65) Prior Publication Data
US 2004/0076117 A1    Apr. 22, 2004

(51) Int. Cl.
*H04Q 7/24* (2006.01)
*H04J 3/00* (2006.01)
*H04B 1/44* (2006.01)
*H04B 7/005* (2006.01)

(52) U.S. Cl. .................. 370/476; 370/282; 370/338; 370/278

(58) Field of Classification Search ................ 370/470, 370/471, 472, 473, 474, 328, 329, 333, 468, 370/395.4, 229, 230, 338, 278, 282, 392, 370/394, 476, 477
See application file for complete search history.

(56) References Cited

U.S. PATENT DOCUMENTS

| | | | |
|---|---|---|---|
| 6,625,165 B1 * | 9/2003 | Krishnamoorthy et al. | 370/465 |
| 6,741,554 B2 * | 5/2004 | D'Amico et al. | 370/225 |
| 6,934,251 B2 * | 8/2005 | Ono | 370/230 |
| 6,963,534 B1 * | 11/2005 | Shorey et al. | 370/230 |
| 7,095,719 B1 * | 8/2006 | Wilhelmsson et al. | 370/465 |
| 7,248,604 B2 * | 7/2007 | Sugar et al. | 370/468 |
| 2002/0122413 A1 | 9/2002 | Sheomake | 370/349 |

FOREIGN PATENT DOCUMENTS

| EP | 1320210 | 6/2003 |
|---|---|---|
| WO | 0199384 | 12/2001 |

OTHER PUBLICATIONS

Shinsuke Hara et al.: "Throughput Performance of Saw-Arq Protocol with Adaptive Packet Length in Mobile Packet Data Transmission" IEEE Transactions on Vehicular Technology, IEEE Inc., New York, US; vol. 45, No. 3, Aug. 1, 1996, pp. 561-569.

* cited by examiner

*Primary Examiner*—Hanh Nguyen
(74) *Attorney, Agent, or Firm*—Howard Seo; Abdollah Katbab; Thomas Rouse

(57) ABSTRACT

A method is provided for partitioning data into packets, where each packet has a type k selected from a set of packet types, and a length $L_k$, in bytes, of payload data. The method includes steps of: determining an expected successful transmit time $E_k$, for packets of type k, for each of the set of packet types; choosing an optimum packet type for which the value $E_k/L_k$ is a minimum; and partitioning the payload data into packets of the optimum packet type. The method is enhanced by computing a bit error rate (BER) from the retransmission rate for single packet type and using the BER to compute retransmission rates for packets of the remaining types. The method is further enhanced by computing transition tables in advance and using the transition tables to select an optimum packet type.

51 Claims, 13 Drawing Sheets

|  | DM5 | DM3 | DM1 |
|---|---|---|---|
| RDM5 | $1.000 \leq RDM5 \leq 2.377$ | $2.377 < RDM5 \leq 38.889$ | $38.889 < RDM5$ |
| RDM3 | $1.000 \leq RDM3 \leq 1.607$ | $1.607 < RDM3 \leq 7.414$ | $7.414 < RDM3$ |
| RDM1 | $1.000 \leq RDM5 \leq 1.081$ | $1.081 < RDM1 \leq 1.391$ | $1.391 < RDM1$ |

931 → 5 SLOT PACKETS ALLOWED, E[RX]=5, DM ONLY

|  | DM5 | DM3 | DM1 |
|---|---|---|---|
| RDM5 | $1.000 \leq RDM5 \leq 2.061$ | $2.061 < RDM5 \leq 29.849$ | $29.849 < RDM5$ |
| RDM3 | $1.000 \leq RDM3 \leq 1.482$ | $1.482 < RDM3 \leq 6.447$ | $6.447 < RDM3$ |
| RDM1 | $1.000 \leq RDM5 \leq 1.066$ | $1.066 < RDM1 < 1.359$ | $1.359 < RDM1$ |

932 → 5 SLOT PACKETS ALLOWED, E[RX]=3, DM ONLY

|  | DM5 | DM3 | DM1 |
|---|---|---|---|
| RDM5 | $1.000 \leq RDM5 \leq 1.588$ | $1.588 < RDM5 \leq 15.990$ | $15.990 < RDM5$ |
| RDM3 | $1.000 \leq RDM3 \leq 1.286$ | $1.286 < RDM3 < 4.566$ | $4.566 < RDM3$ |
| RDM1 | $1.000 \leq RDM5 \leq 1.043$ | $1.043 < RDM1 < 1.284$ | $1.284 < RDM1$ |

933 → 5 SLOT PACKETS ALLOWED, E[RX]=1, DM ONLY

| DM3 | DM1 |
|---|---|
| $1.000 \leq R_{DM3} \leq 7.407$ $1.000 \leq R_{DM1} \leq 1.389$ | $7.407 < R_{DM3}$ $1.389 < R_{DM1}$ |

3 SLOT PACKETS OR LESS, $E[R_X]=5$, DM ONLY

942:

| DM3 | DM1 |
|---|---|
| $1.000 \leq R_{DM3} \leq 6.442$ $1.000 \leq R_{DM1} \leq 1.359$ | $6.442 < R_{DM3}$ $1.359 < R_{DM1}$ |

3 SLOT PACKETS OR LESS, $E[R_X]=3$, DM ONLY

943:

| DM3 | DM1 |
|---|---|
| $1.000 \leq R_{DM3} \leq 4.566$ $1.000 \leq R_{DM1} \leq 1.284$ | $4.566 < R_{DM3}$ $1.284 < R_{DM1}$ |

3 SLOT PACKETS OR LESS, $E[R_X]=1$, DM ONLY

FIG. 9D

DATA PARTITION METHOD TO MAXIMIZE BLUETOOTH BASEBAND THROUGHPUT

BACKGROUND OF THE INVENTION

The present invention generally relates to wireless communication devices and, more specifically, to short-range radio links for communication between electronic devices, which may be portable.

Bluetooth™ wireless technology is intended to allow wireless connections enabling links between mobile computers, mobile phones, portable handheld devices, and connectivity to the Internet. The specification is developed, published and promoted by the trade association Bluetooth Special Interest Group (SIG), also referred to as Bluetooth SIG, Inc. For example, "Specification of the Bluetooth System", Core, Version 1.1, Feb. 22, 2001, is available from the website www-.bluetooth.org and incorporated herein by reference. The Bluetooth™ wireless specification defines a low-power, low-cost technology that provides a standardized platform for a short-range (i.e., maximum transmit output power limited to 100 milli-Watts (mW)—equivalently 20 decibels relative to one milli-Watt (dBm)—as specified in the Bluetooth™ wireless specification) radio link for eliminating cables between mobile devices and facilitating connections between products. It is envisioned that Bluetooth™ technology may be used, for example, to eliminate the need for wired connections between electronic products and accessories; to exchange files, business cards, and calendar appointments with groups of Bluetooth™ users; to transfer and synchronize files between devices; to connect to localized content services in public areas; and to function as remote controls, keys, tickets, and e-cash wallets.

The Bluetooth™ wireless specification includes both link layer and application layer definitions. Radios that comply with the Bluetooth™ wireless specification operate in the unlicensed, 2.4 GHz radio spectrum ensuring communication compatibility worldwide. As shown in FIG. 1, a Bluetooth™ wireless communication device 100 may consist of a radio unit 102, a link controller 104, and a link manager 106. Device 100 may interface to host 108, which may be an electronic device such as a cell phone or laptop computer, for which a short-range radio communication link using Bluetooth™ is desired. Device 100, with its associated host 108, may also be referred to as a Bluetooth™ unit. Link controller 104 carries out the baseband protocols and other low-level link routines, i.e., processes or algorithms, as specified by the Bluetooth™ baseband specification, and may also perform other algorithms such as data partitioning. Link manager 106 may carry out the link manager protocols (LMP), the logical link control and adaptation layer protocol, referred to as L2CAP, and may incorporate the host controller interface (HCI), as specified by the Bluetooth™ baseband specification.

While point-to-point connections, i.e., there are only two Bluetooth™ units involved, are supported, the Bluetooth™ specification also supports point-to-multipoint connections, allowing up to seven simultaneous connections to be established and maintained by a single radio. For example, FIG. 2a shows a point-to-point connection 201 between a first Bluetooth™ unit 202 and a second Bluetooth™ unit 204. Bluetooth™ units 202, 204 may each include a Bluetooth™ wireless communication system—such as system 100 including an associated host 108 for each system, such as a cell phone or personal computer. In a point-to-multipoint connection 203, as illustrated in FIG. 2b, the channel is shared among several Bluetooth™ units, such as Bluetooth™ units 206, 208, 210, and 212 seen in FIG. 2b. Two or more units sharing the same channel form a piconet—such as piconets 214 and 216 seen in FIGS. 2a and 2b. In a piconet, one Bluetooth™ unit acts as the master of the piconet, whereas the other unit(s) acts as slave(s). For example, Bluetooth™ unit 202 acts as master of piconet 214, Bluetooth™ unit 204 acts as slave of piconet 214, Bluetooth™ unit 206 acts as master of piconet 216, and Bluetooth™ units 208, 210, and 212 act as slaves of piconet 216. Each piconet can have only a single master. Up to seven slaves can be active in a piconet. For slaves, the channel access is controlled by the master, and slaves are synchronized to the master. FIG. 2c illustrates a scatternet 218, wherein three piconets connect to each other.

Communication between Bluetooth™ units may be conceptualized as occurring on several different layers concurrently. As illustrated in FIG. 3, communication 301 may occur between first Bluetooth™ unit 302 and second Bluetooth™ unit 304. For example, first Bluetooth™ unit 302 may act as a master—such as Bluetooth™ unit 202 in piconet 214, and second Bluetooth™ unit 304 may act as a slave—such as Bluetooth™ unit 204 in piconet 214. Communication 301 may take place at several different layers, for example, high level layer 306, network layer 308, link layer 310, and the physical layer referred to as baseband layer 312. Information may be exchanged between layers, as represented by arrow 314 and arrow 316. The link manager protocols—LMP 318, 320—and the logical link control and adaptation layer protocols L2CAP 322, 324—may be included in link layer 310.

At the physical layer—baseband layer 312—wireless communication in Bluetooth™ is over a slotted, time division duplex (TDD) channel between the master, for example, first Bluetooth™ unit 302, and the slave, for example, second Bluetooth™ unit 304. For example, it may be specified that the master transmits during even numbered time slots while the slave transmits during odd numbered time slots. The nominal length of each time slot for Bluetooth™ wireless systems is 625 microseconds.

Thus, the data to be transmitted is partitioned into baseband packets before being transmitted over the air. FIG. 4 shows a standard packet format for a baseband packet 400 according to the Bluetooth™ baseband specification. Baseband packet 400 may be formatted into various portions, the length and content of which may vary depending on the type of packet. For example, baseband packet 400 may include an access code 402 containing 72 bits of data, which may be relevant, for example, to the various link management protocols. Baseband packet 400 may include a header 404 containing 54 bits of data, some of which may be used for describing the payload data 406. Payload data 406 may contain data from a higher layer packet of data. The length $L_k$ of payload data 406 may vary, for example, from 0 to 2,745 bits and may or may not be encoded with a forward error correcting code (FEC) depending on the type of packet. In Bluetooth™, there are six types of packets that are of particular interest for the transmission of data, which are briefly summarized in Table 1, below.

TABLE 1

| k | Packet type | $L_k$ Length (user bytes) | $(TX)_k$ (number of time slots) |
|---|---|---|---|
| 1 | DM1 | 17 | 1 |
| 2 | DH1 | 27 | 1 |
| 3 | DM3 | 121 | 3 |
| 4 | DH3 | 183 | 3 |
| 5 | DM5 | 224 | 5 |
| 6 | DH5 | 339 | 5 |

The "DH" are mnemonic designations representing "data—medium rate" and "data—high rate", respectively. The number k, ranging from 1 to 6, is used as an index so that any particular packet can be referred to as a packet of type k. For example, the DM1 packet type may be referred to as a type 1 packet. Payload 406 for the medium rate packet types (with an "M" in their names) are FEC coded using a (10, 15) Hamming code. Payload 406 for the high rate packet types (with an "H" in their names) are not FEC coded. Depending on the length of the packet, the time $(TX)_k$ required for the transmission of the packet may be 1, 3, or 5 time slots, as shown in Table 1. Thus, there are packets of three different lengths (1; 3; and 5 time slots long), with coded and uncoded packets for each length. While the uncoded ("H") packets have a higher data rate, briefly described as the amount of payload 406 user data transmitted per unit of time, than the coded ("M") packets of the same length, they are more prone to error (because of not being coded) and are likely to have higher retransmission rates. Similarly, longer packets may have higher data rates but are also likely to have higher retransmission rates. During communication, the Bluetooth™ upper layers—such as link layer 310—including L2CAP 322, 324—typically give the baseband layer 312 a higher layer packet of data, i.e. payload 406 data, to be transmitted. Typically, the length of the higher layer packet of data is of the order of several baseband packets. The baseband layer 312 is required to partition the higher layer packet of data into baseband packets 400 and transmit the baseband packets 400 over the air.

The Bluetooth™ baseband layer 312 implements an automatic repeat request scheme, wherein each packet of type k, transmitted by the transmitting unit—such as first Bluetooth™ unit 302—has to be explicitly acknowledged by the receiving device—such as second Bluetooth™ unit 304. A positive acknowledgement (ACK) would mean successful reception whereas a negative acknowledgement (NAK) would mean a failure to receive the packet. The device transmitting the packet—such as first Bluetooth™ unit 302—would retransmit it until either an ACK is received or a timeout is hit. Because there are different types and lengths of baseband packets, different retransmission rates may be expected for each different type and length of packet. In addition, varying channel conditions, such as the presence or absence of radio interference, may also affect the retransmission rates for each different type and length of packet. It is desirable that a data packet partitioning algorithm implemented in baseband layer 312 should partition transmit data into packets of types that achieve high throughput, i.e., high efficiency expressed as the amount of data transmitted per unit of time.

As can be seen, there is a need for a method that; when given a chunk of data by the upper layers, partitions the chunk of data into packets of various types such that the total time needed to successfully transmit the chunk of data is the least amount possible for the types allowed; thus maximizing the data throughput on a radio channel.

SUMMARY OF THE INVENTION

In one aspect of the present invention, a method is provided for partitioning data into packets, of type k selected from a set of packet types. The method includes steps of: determining an expected successful transmit time $E_k$, for packets of type k, for each of the set of packet types; choosing an optimum packet type for which the value $E_k/L_k$ (where $L_k$ is the length in bytes of a packet of type k) is a minimum; and partitioning the payload data into packets of the optimum packet type.

In another aspect of the present invention, a method is provided for partitioning data into packets, each packet having a type k, selected from a plurality of packet types, and a length $L_k$, in bytes, of data. The method includes steps of: determining a retransmission rate for packets of a single type; computing a BER from the retransmission rate for packets of the single type; computing, using the BER, a retransmission rate $R_k$, for packets of type k, for each of the plurality of packet types; computing, using the retransmission rate $R_k$, an expected successful transmit time $E_k$, for packets of type k, for each of the plurality of packet types; choosing an optimum packet type for which the value $E_k/L_k$ is a minimum; and partitioning the data into packets of the optimum packet type.

In still another aspect of the present invention, a method is provided for partitioning data into packets for transmission in a wireless communication system, each packet having a type k, selected from a plurality of packet types, and a length $L_k$, in bytes, of data. The method includes steps of: 1) computing, from a plurality of given expected receive time values, a plurality of transition tables, wherein each transition table of the plurality of transition tables embodies a correspondence between retransmission rate values and optimal packet types, wherein the correspondence depends on one of the plurality of given expected receive time values; 2) determining an actual expected receive time E[(RX)]; 3) selecting a selected transition table, from the plurality of transition tables, for which the selected transition table depends on one of the plurality of given expected receive time values that is closest to the actual expected receive time E[(RX)]; 4) determining a current retransmission rate for packets of a transmitted packet's type; 5) comparing the current retransmission rate for the transmitted packet's type to a transition value in the selected transition table; 6) choosing an optimum packet type according to the selected transition table; and 7) partitioning the data into packets of the optimum packet type.

In yet another aspect of the present invention, a method is provided for partitioning data into packets for transmission in a wireless communication system, each packet having a type k, selected from one of the 6 packet types DM1, DH1, DM3, DH3, DM5, DH5, and a length $L_k$, in bytes, of data. The method includes steps of: 1) counting a total number of transmissions of packets of type k; 2) counting a number of successful transmissions of packets of type k; 3) computing a retransmission rate $R_k$, for packets of type k, as the total number of transmissions divided by the number of successful transmissions; 4) determining an expected receive time E[(RX)] as an average number of time slots; 5) computing a total expected acknowledged transmit time $T_k$ as $T_k=(TX)_k+$E[(RX)]; 6) computing an expected successful transmit time $E_k$, for packets of type k, as $T_k$ multiplied by $R_k$; 7) choosing an optimum packet type, from the 6 types, for which the value $E_k/L_k$ is a minimum according to a transition algorithm; and 8) partitioning the data into packets of the optimum packet type.

These and other features, aspects and advantages of the present invention will become better understood with reference to the following drawings, description and claims.

BRIEF DESCRIPTION OF THE DRAWINGS

FIGS. 9A, 9B, 9C and 9D are transition table specifications for partition algorithms according to an embodiment of the present invention.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, an embodiment of the present invention provides a partition algorithm that maximizes data throughput on a radio channel. More specifically, one embodiment of the present invention provides a baseband layer procedure for partitioning higher layer data into baseband packets. The procedure, in order to maximize data throughput over the channel, takes into account the current channel conditions. In other words the procedure is responsive to varying channel conditions, which may affect, for example, retransmission rates (equivalently packet error rates) for the different types of baseband packets and the length of packets received. In contrast to prior art procedures, which may ignore the length of packets received, one embodiment of the present invention measures and takes into account not only the retransmission, or packet error, rates but the average length of packets received when partitioning higher layer data into baseband packets. Thus, one embodiment of the present invention also provides a partition algorithm that partitions data into packets according to varying channel conditions so as to maximize data throughput on a radio channel. In another embodiment, the best packet type for each possible range of retransmission rates may be calculated in advance to further enhance responsiveness to channel conditions. The advance calculations also take into account different possible lengths of packets received, in contrast to the prior art. One embodiment of the present invention may be particularly useful for Bluetooth™ wireless systems where there is no pre-existing specification for baseband data partitioning algorithms.

Figure 1:
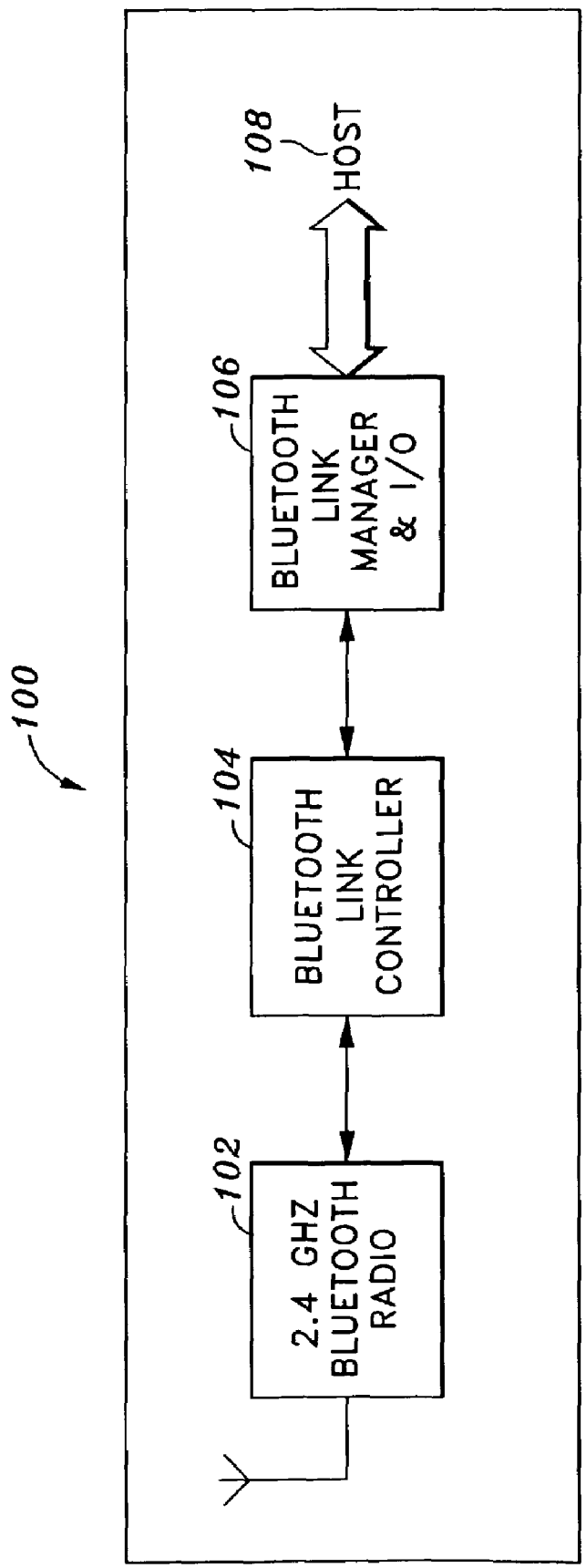
FIG. 1 is a block diagram of a prior art wireless communication system.
Figure 2:
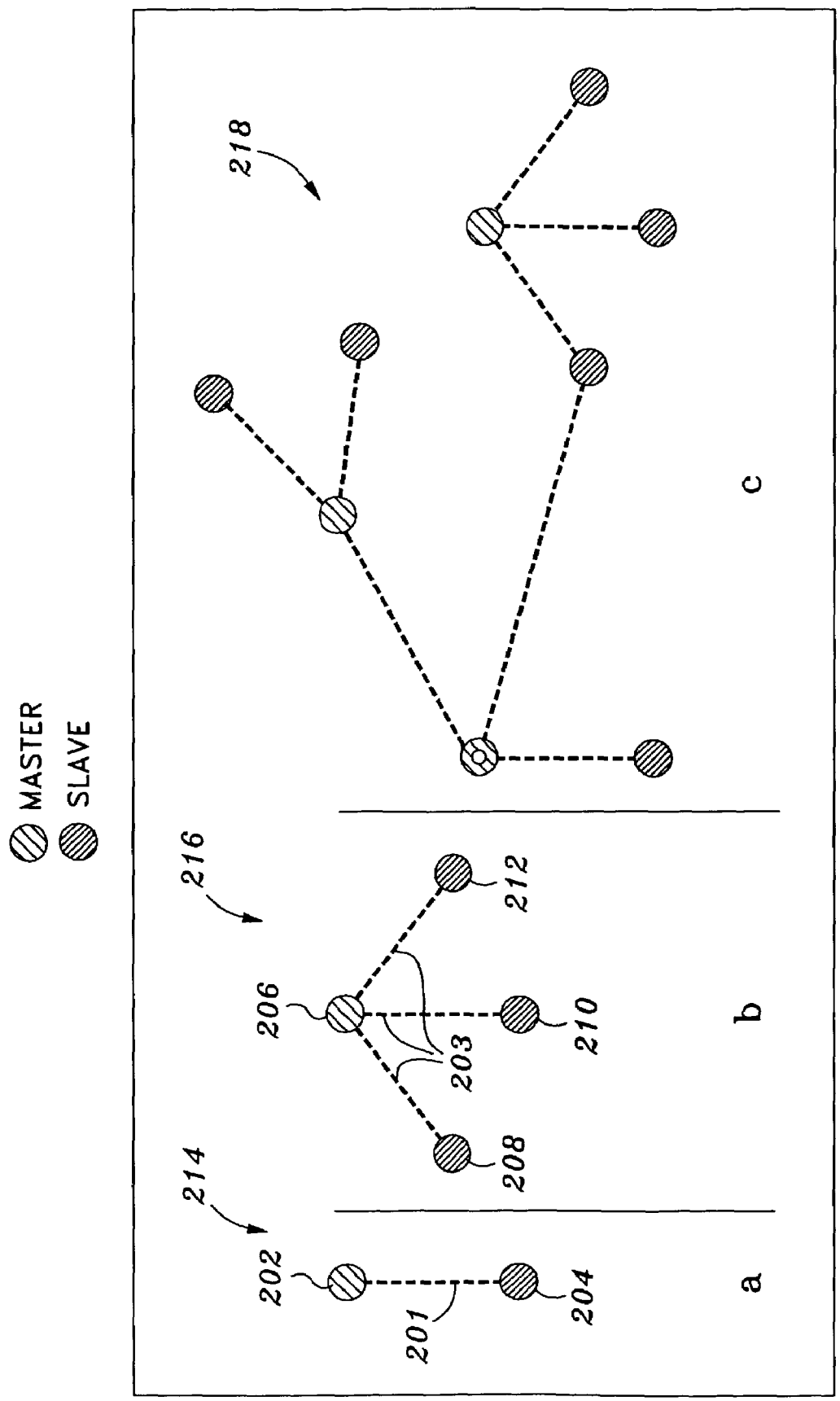
FIGS. 2a, 2b, and 2c are diagrams of prior art short-range radio communication networks.
Figure 3:
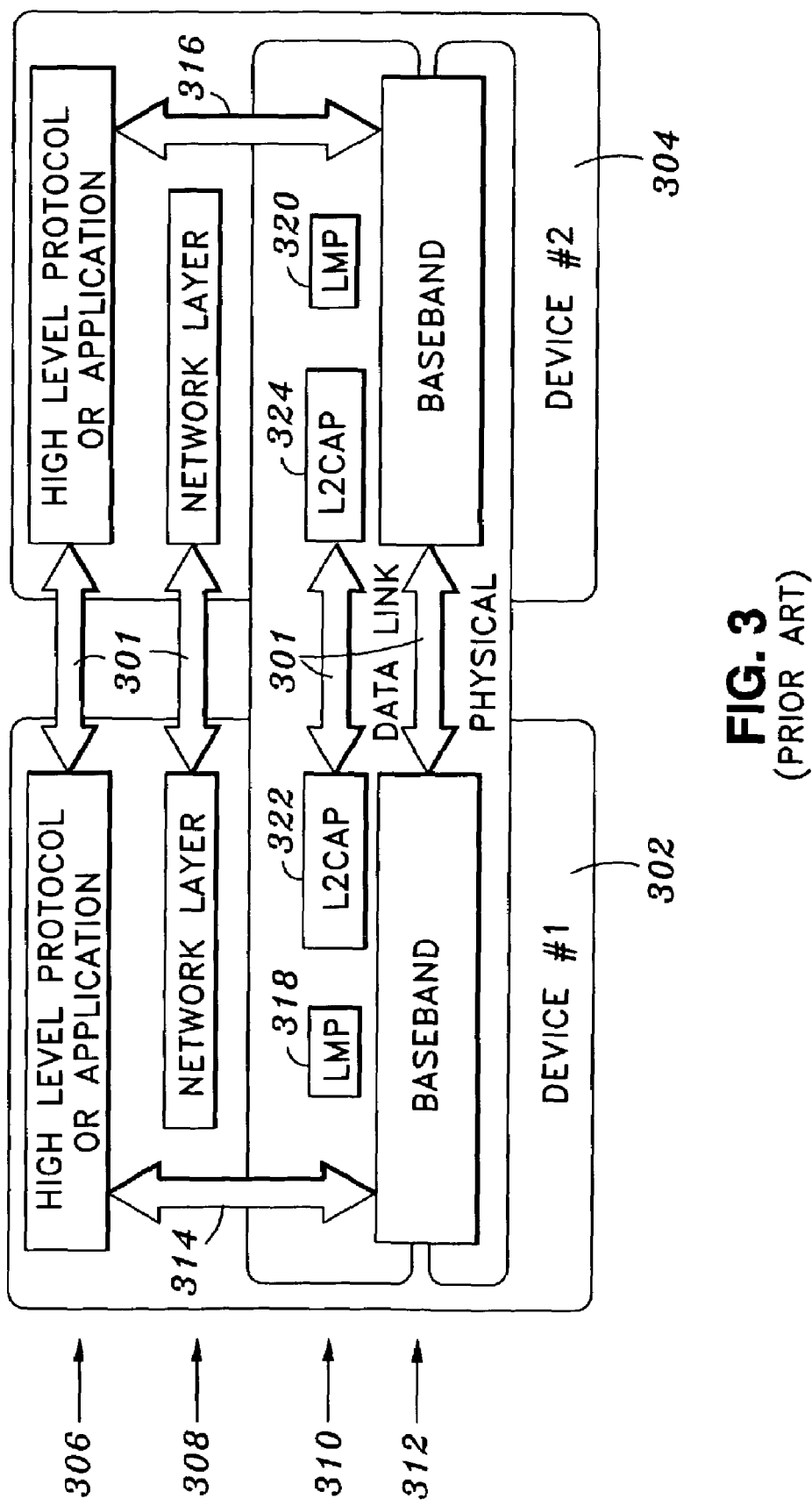
FIG. 3 is a diagram of protocol layers for a prior art wireless communication system.
Figure 4:
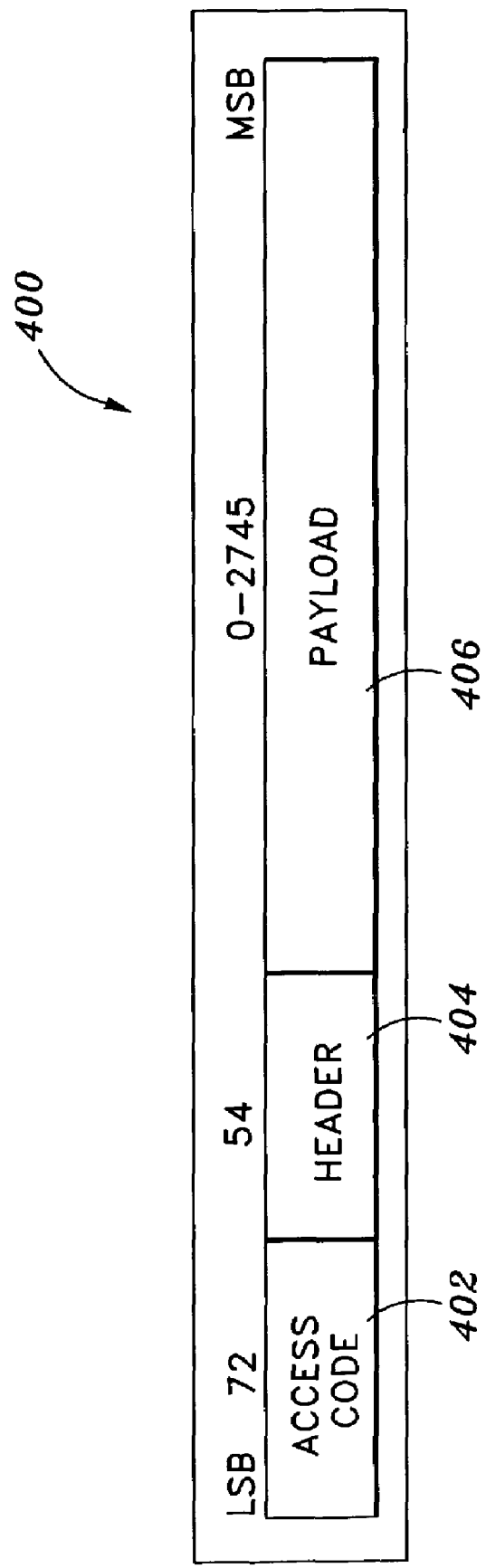
FIG. 4 is a diagram of standard baseband packet formats for prior art Bluetooth™ wireless communication systems.
Figure 5:
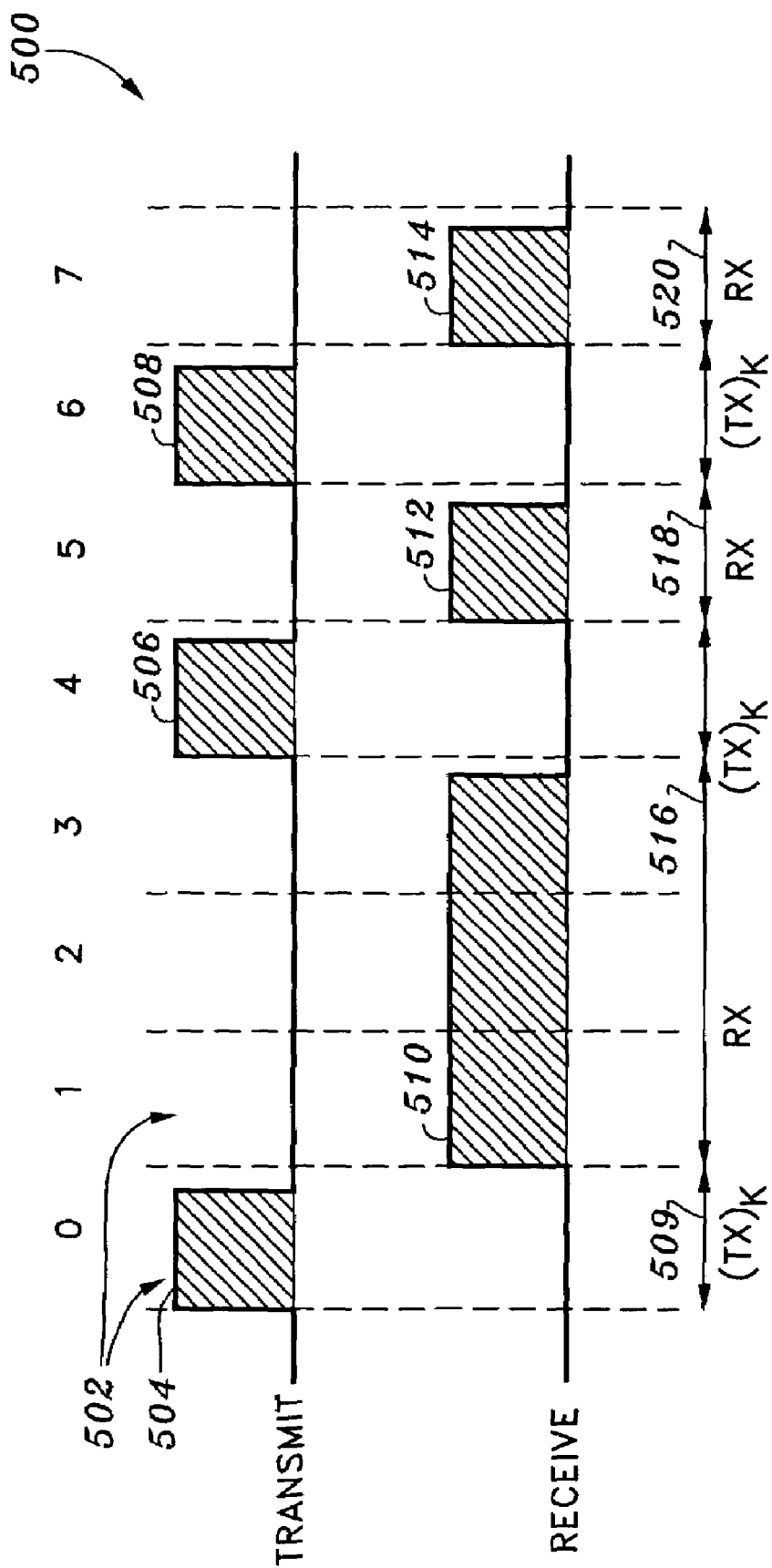
FIG. 5 is a timing diagram for one example of baseband packet transmission and reception according to an embodiment of the present invention.

Referring now to FIG. 5, timing diagram 500 illustrates an example of baseband packet transmission and reception by a single unit according to an embodiment of the present invention. Transmission and reception between units may occur only in time slots such as time slots 502. Time slots 502 may also be numbered. For example, in FIG. 5 time slots 502 are numbered from 0 through 7. As described above, transmission by a unit—such as unit 202 or unit 204—may begin in even numbered time slots while reception by a unit may begin in odd numbered time slots. Thus, the example of FIG. 5 shows 1-slot transmissions 504, 506, and 508 beginning in even time slots 0, 4, and 6, respectively. Thus, the transmit time 509, also denoted as TX, for transmission 504 is 1 time slot. If the packet transmitted in transmission 504 is of type k, transmit time 509 may also be denoted as $(TX)_k$. Thus, for 1-slot packet such as that transmitted by transmission 504, the packet type may be either DM1 or DH1, corresponding to index k having the value of either 1 or 2, respectively. Thus, assuming a packet of type DH1, transmit time 509 may also be equivalently denoted as either $(TX)_{DH1}$ or $(TX)_2$. The example of FIG. 5 shows receptions 510, 512, and 514 beginning in odd time slots 1, 5, and 7 respectively. Reception 510 is a 3-slot reception, thus the receive time 516, also denoted RX, is 3 slots. Depending, on the type of packet received, the receive time 516 may be 1, 3, or 5 slots. For example, receive time 518 and receive time 520 are each 1 time slot. Thus, the expected receive time, denoted E[(RX)] for the example shown in FIG. 5, may be determined by calculating the average, or mean, of receive times 516, 518, and 520, that is, E[(RX)]=5/3 or 1.667 time slots. For example, the processor of a unit—such as unit 202—may be used to measure E[(RX)] by keeping track of the value of RX during communication and keeping a running average of RX so that a value of E[(RX)] may be known during communication.

A positive or negative acknowledgement (ACK/NAK) for a transmission—such as transmissions 504, 506, and 508—may be placed on the beginning of a reception—such as receptions 510, 512, and 514. The total expected time to transmit a packet of type k and receive an ACK/NAK in return, also referred to as the total expected acknowledged transmit time $T_k$, thus may depend on the average receive time, i.e., the expected receive time E[(RX)]. The total expected acknowledged transmit time $T_k$ may, thus, be computed as $T_k=(TX)_k+E[(RX)]$. For the example shown in FIG. 5, in which k=2, or equivalently k=DH1, $(TX)_k$ is 1 slot and E[(RX)]=1.667 slots so $T_k$=2.667 slots. The processor of a unit—such as unit 202—may be used to compute the value of $T_k$ during communication, for example, by keeping track of the transmit times $(TX)_k$—such as transmit time 509—and adding a running average E[(RX)] so that a value of $T_k$ may be known during communication.

Still referring to FIG. 5, the processor of a unit—such as unit 202—may be used to compute a retransmission rate $R_k$ for packets of type k, for each possible value of k, by keeping a separate count, for each possible value of k, of the total number of transmissions of packets of type k, and the number of successful transmissions of packets of type k, i.e., those transmissions—such as transmission 504—for which an ACK is received in return. A retransmission rate $R_k$ for packets of type k may then be computed, for example by dividing the total number of transmissions of packets of type k by the number of successful transmissions of packets of type k. In the example shown in FIG. 5, assuming that each of transmissions 504, 506, and 508 transmits a packet of type DH1 (i.e., k=2) and that transmissions 504 and 506 are unsuccessful but that transmission 508 is successful, i.e., receives an ACK in return, the total number of transmissions for a packet of type 2 is 3 and the number of successful transmissions for a packet of type 2 is 1. Thus, the retransmission rate for packets of type 2, in this example, may be calculated as 3 divided by 1, i.e., the retransmission rate $R_2$=3. It may be noted that, mathematically, the value of the retransmission rate $R_k$ is always greater than or equal to 1.

Still referring to FIG. 5, the processor of a unit—such as unit 202—may be used to compute an expected successful transmit time $E_k$, for packets of each type k. The expected successful transmit time $E_k$ for packets of type k may be computed as the mean, or average, time for a packet of type k to be successfully transmitted and, thus, depends on the total expected time to transmit a packet of type k and receive an ACK/NAK in return as well as the retransmission rate for packets of type k required to transmit packets successfully. Thus, expected successful transmit time $E_k$ for packets of type k may be computed as $T_k$ multiplied by $R_k$, for each type k. Continuing with the above example, illustrated in FIG. 5, in which $T_2$=2.667 slots and $R_2$=3, the expected successful transmit time $E_k$ for packets of type 2 is 2.667 slots multiplied by 3 so that $E_2$=8 slots. Similarly, as packets of each type k are transmitted the expected successful transmit time $E_k$ may be computed. An average time for each payload byte of data may then be calculated as $E_k/L_k$, depending on each packet type k, where $L_k$ is the number of payload bytes of data in a packet of type k and, for example, may be as shown in the second column of Table 1.

Continuing with the above example, illustrated in FIG. 5, in which $E_k$=8 slots for packets of type 2, and using the value of $L_2$=27 from Table 1, an average time for each payload byte may be calculated as $E_k/L_k$=8/27 slot for packets of type 2. The fastest data transmission, i.e., highest payload data throughput, may occur for that packet type k for which the average time to communicate each payload byte of data is the least. Therefore, it may be desirable to minimize $E_k/L_k$ by choosing to partition the payload data into, and transmit the payload data in, packets of that type k for which the value of $E_k/L_k$ is at a minimum among all the packet types being transmitted. Example One, below, illustrates a mathematical justification for choosing to partition the payload data into packets of that type k for which the value of $E_k/L_k$ is at a minimum.

Figure 6:
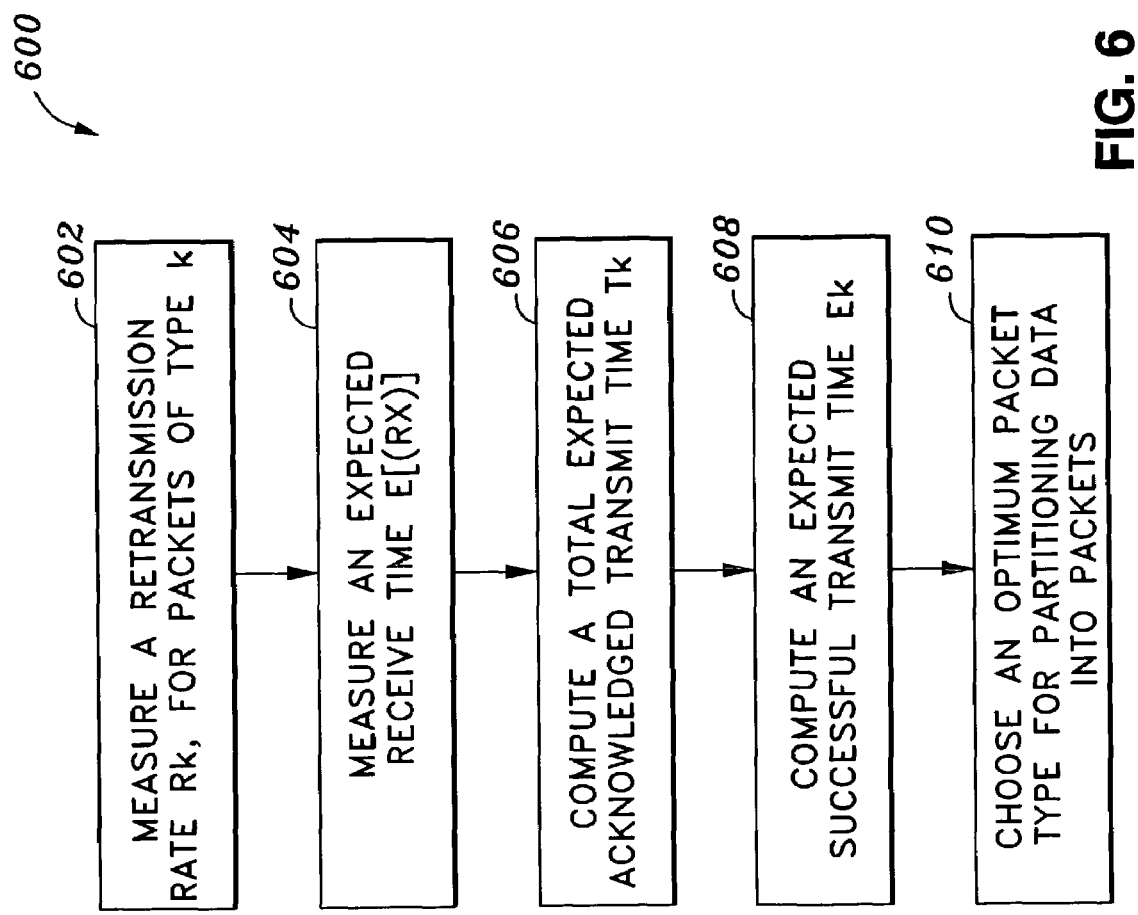
FIG. 6 is a flow chart illustrating one example of a method using a partition algorithm for a wireless communication system in accordance with an embodiment of the present invention.

Referring now to FIG. 6, a flowchart illustrates an exemplary embodiment of method 600 for partitioning data into packets of any of several different types, as described above, where each packet may have a type k and a length $L_k$, depending on the type k, as described above. Method 600 may be implemented, for example, in software loaded in a memory in a wireless communication device—such as Bluetooth™ wireless communication device 100. Method 600 may also be implemented, for example, in hardware, such as a DSP module, contained, for example, in link controller 104 or in link manager 106.

Exemplary method 600 may include steps 602, 604, 606, 608, and 610, which conceptually describe portions of method 600 for purposes of conveniently illustrating method 600 according to one embodiment, but which do not necessarily limit method 600. In other words, method 600 could be implemented by different steps in different orders from that shown in FIG. 6 and still achieve the partitioning of data into packets of different types for a wireless communication device in accordance with the invention. Exemplary method 600 is illustrated with reference to the example described above and illustrated by FIG. 5.

Method 600 may begin with step 602 in which a retransmission rate $R_k$ for packets of each type k may be measured by keeping a separate count, for each k, of the total number of transmissions of packets of type k, and another separate count, for each k, of the number of successful transmissions of packets of type k, and dividing the total number of transmissions of packets of type k by the number of successful transmissions of packets of type k to compute the retransmission rate $R_k$.

Method 600 may continue with step 604 in which the expected receive time E[(RX)] is measured by, for example, keeping track in a microprocessor of receive times RX—such as receive time 516 shown in FIG. 5—and calculating a running average, as described above, while communication using a wireless communication device—such as Bluetooth™ wireless communication device 100—is taking place.

Method 600 may continue with step 606 in which a total expected acknowledged transmit time $T_k$, for each type k of packets being transmitted while communication using a wireless communication device—such as device 100—is taking place, may be computed as $T_k=(TX)_k+E[(RX)]$, as described above.

Method 600 may continue with step 608 in which an expected successful transmit time $E_k$ for each type k of packets being transmitted while communication using a wireless communication device—such as device 100—is taking place, may be computed as $T_k$ multiplied by $R_k$, as described above.

Method 600 may continue with step 610 in which an optimum packet type may be chosen, as described above, as that type k for which the value of $E_k/L_k$ is at a minimum among all the packet types being transmitted while communication using a wireless communication device—such as device 100—is taking place. Method 600 may continue to be executed, for example, after completion of step 610 so that steps 602, 604, 606, 608, and 610 continue to be performed during communication using wireless communication device 100. Thus, the values of retransmission rates may be continually updated at step 602; expected receive time may be continually updated at step 604; the computations at steps 606, 608, and 610 may be continually updated; and optimum packet type may be reselected at step 610 as conditions may change during communication using wireless communication device 100.

Figure 7:
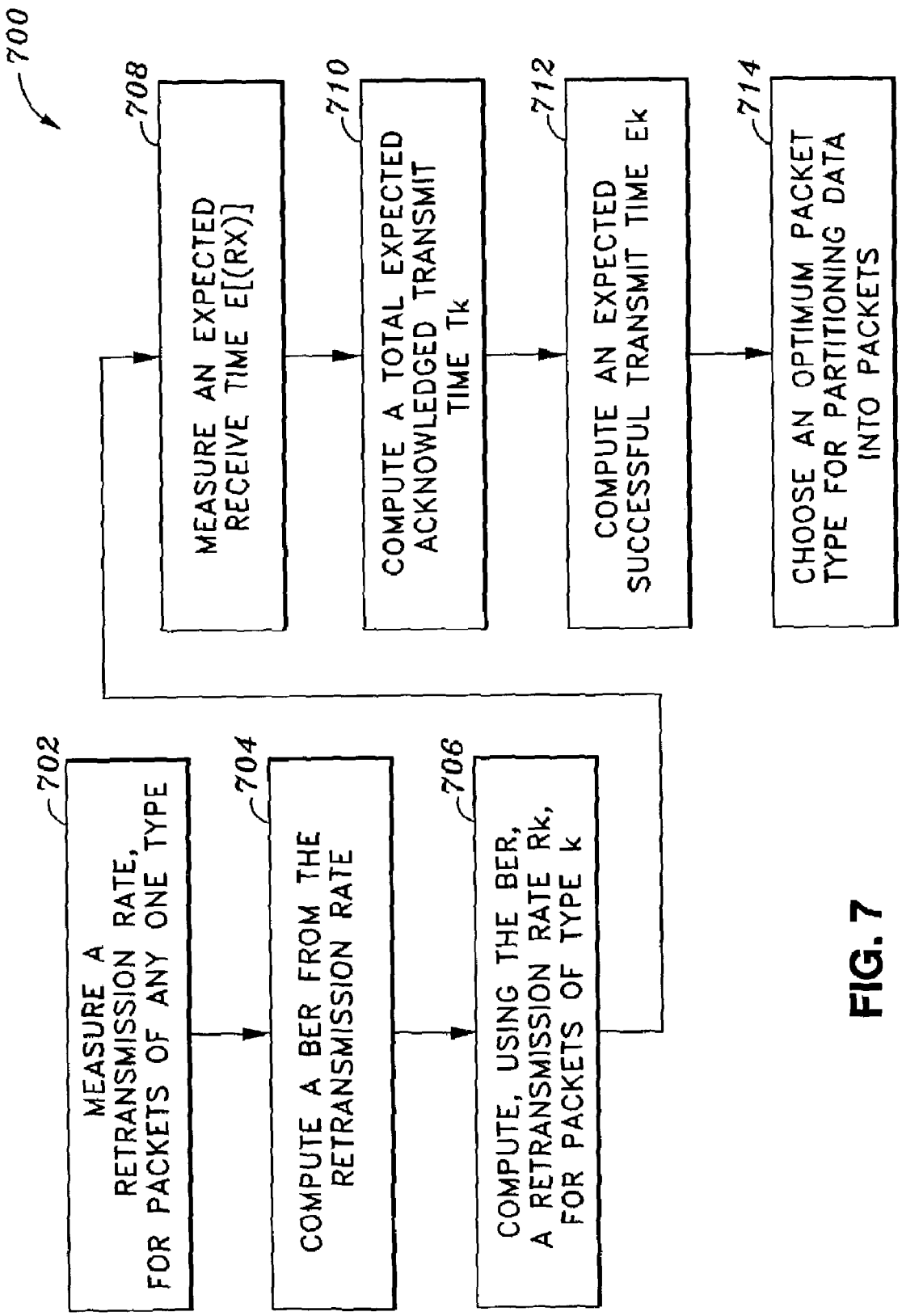
FIG. 7 is a flow chart illustrating one example of a method using a partition algorithm for a wireless communication system in accordance with another embodiment of the present invention.

Referring now to FIG. 7, a flowchart illustrates a further exemplary embodiment of method 700 for partitioning data into packets of any of several different types, as described above, where each packet may have a type k and a length $L_k$, depending on the type k, as described above. In the embodiment illustrated in FIG. 7, once a packet retransmission rate has been determined for packets of one type, the retransmission rates for packets of the other types may be computed rather than determining the retransmission rates for the other types directly, as may be performed by the embodiment illustrated in FIG. 6. In the exemplary embodiment of method 700, for example, a bit error rate (BER) may be computed from the first retransmission rate, and the other retransmission rates may then be computed from the BER. Method 700 may be implemented, for example, in software loaded in a memory in a wireless communication device—such as Bluetooth™ wireless communication device 100. Method 700 may also be implemented, for example, in hardware, such as a DSP module, contained, for example, in link controller 104 or in link manager 106.

Exemplary method 700 may include steps 702, 704, 706, 708, 710, 712, and 714, which describe portions of method 700 for purposes of conveniently illustrating method 700 according to another embodiment, but which do not necessarily limit method 700. In other words, method 700 could be implemented by different steps in different orders from that shown in FIG. 7 and still achieve the partitioning of data into packets of different types for a wireless communication device in accordance with the invention. Exemplary method 700 is illustrated with reference to the example described above and illustrated by FIG. 5.

Method 700 may begin with step 702 in which a retransmission rate $R_k$ for packets of one particular type k, i.e., a single type, may be measured by keeping a separate count of the total number of transmissions of packets of the single type and another separate count of the number of successful transmissions of packets of the single type, and dividing the total number of transmissions of packets of the single type by the number of successful transmissions of packets of the single type to compute the retransmission rate $R_k$ for packets of the single type. For example, k may be chosen as the type of packet that is currently being transmitted during communication using a wireless communication device—such as Bluetooth™ wireless communication device 100.

Method 700 may continue with step 704 in which a BER may be computed for packets of the single type for which the retransmission rate was computed at step 702. A BER may be computed, for example, by first calculating a packet error rate $P_k$ from the retransmission rate $R_k$ for packets of the single type by setting $P_k=1-1/R_k$. Then, for uncoded packet types—such as DH1, DH3, and DH5—the BER may be calculated by solving $$P_k=1-(1-BER)^{36}(1+2BER)^{18}(1-BER)^{bk}$$

where bk is the number of bits of payload data, including payload header, as known in the art. Then, for coded packet types—such as DM1, DM3, and DM5—the BER may be calculated by solving $$P_k=1-(1-BER)^{36}(1+2BER)^{18}(1-BER)^{14\lceil bk/10\rceil}(1+14BER)^{\lceil bk/10\rceil}$$

where bk is the number of bits of payload data, including payload header and coding bits—such as cyclic redundancy code (CRC) bits, as known in the art. Example Two, below, illustrates a mathematical justification for using the above two formulas to calculate BER.

Method 700 may continue with step 706 in which a retransmission rate $R_k$ for packets of each type k different from the single type for which the retransmission rate was computed at step 702 may be computed from the BER as follows. For uncoded packet types—such as DH1, DH3, and DH5—retransmission rate $R_k$ may be computed using the formula:

$$R_k=(1-BER)^{-36}(1+2BER)^{-18}(1-BER)^{-bk}$$

where bk is the number of bits of payload data, including payload header, as known in the art. For coded packet types—such as DM1, DM3, and DM5—retransmission rate $R_k$ may be computed using the formula:

$$R_k=(1-BER)^{-36}(1+2BER)^{-18}(1-BER)^{-14\lceil bk/10\rceil}(1+14BER)^{-\lceil bk/10\rceil}$$

where bk is the number of bits of payload data, including payload header and coding bits—such as cyclic redundancy code (CRC) bits, as known in the art. Example Two, below, illustrates a mathematical justification for using the above two formulas to calculate retransmission rate $R_k$.

Method 700 may continue with step 708 in which the expected receive time E[(RX)] is measured by, for example, keeping track in a microprocessor of receive times RX—such as receive time 516 shown in FIG. 5—and calculating a running average, as described above, while communication using a wireless communication device—such as Bluetooth™ wireless communication device 100—is taking place.

Method 700 may continue with step 710 in which a total expected acknowledged transmit time $T_k$ for each type k of packets being transmitted while communication using a wireless communication device—such as device 100—is taking place, may be computed as $T_k=(TX)_k+E[(RX)]$, as described above.

Method 700 may continue with step 712 in which an expected successful transmit time $E_k$ for each type k of packets being transmitted while communication using a wireless communication device—such as device 100—is taking place, may be computed as $T_k$ multiplied by $R_k$, as described above.

Method 700 may continue with step 714 in which an optimum packet type may be chosen, as described above, as that type k for which the value of $E_k/L_k$ is at a minimum among all the packet types being transmitted while communication using a wireless communication device—such as device 100—is taking place. Method 700 may continue to be executed, for example, after completion of step 714 so that steps 702, 704, 706, 708, 710, 712, and 714 continue to be performed during communication using wireless communication device 100. Thus, the values of retransmission rates may be continually updated at steps 702 through 706; expected receive time may be continually updated at step 708; the computations at steps 710, 712, and 714 may be continually updated; and an optimum packet type may be reselected at step 714 as conditions may change during communication using wireless communication device 100.

Figure 8:
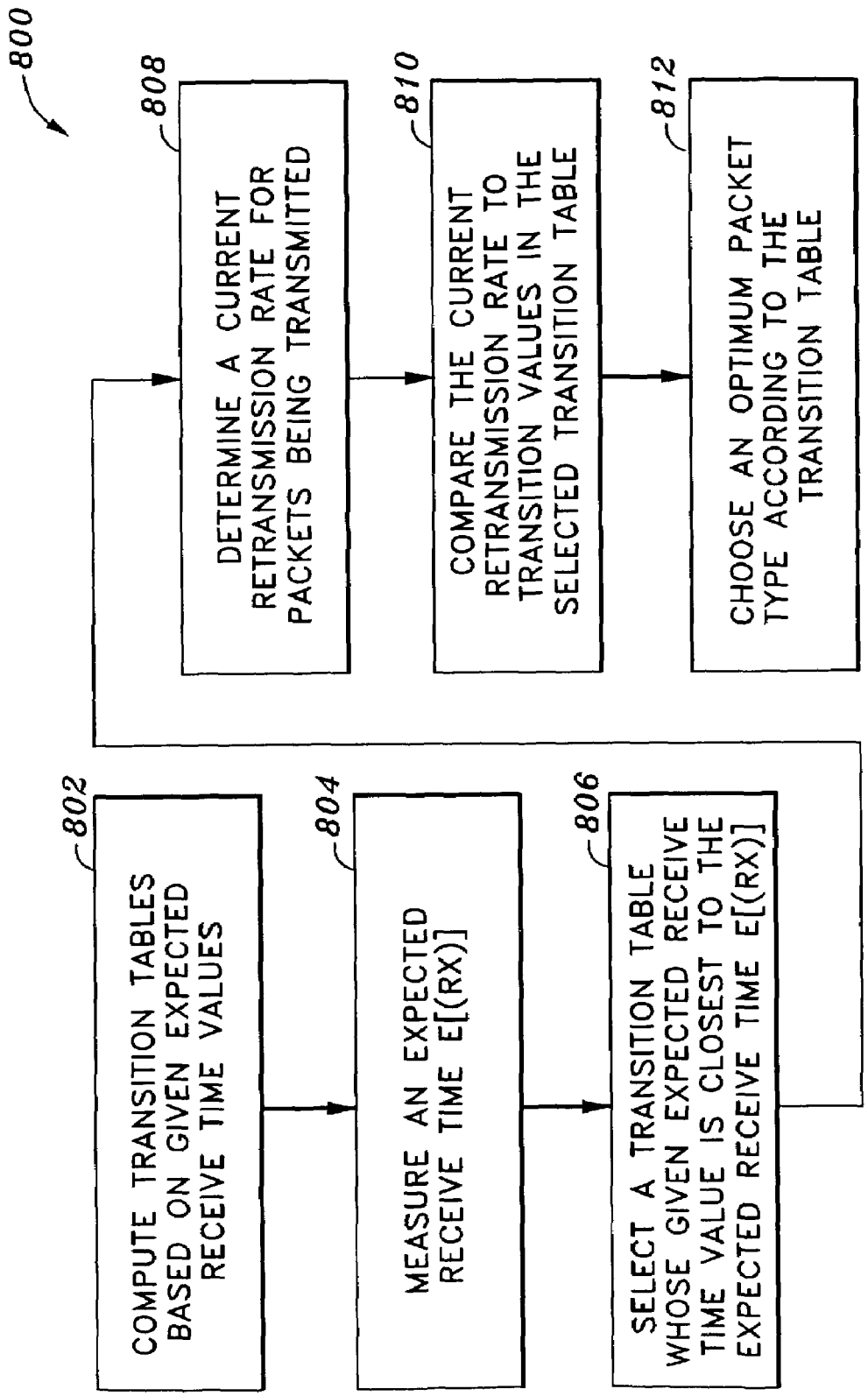
FIG. 8 is a flow chart illustrating one example of a method using a partition algorithm for a wireless communication system in accordance with a further embodiment of the present invention.

Referring now to FIG. 8, a flowchart illustrates another exemplary embodiment of method 800 for partitioning data into packets of any of several different types, as described above, where each packet may have a type k and a length $L_k$, depending on the type k, as described above. In the embodiment illustrated in FIG. 8, the optimal packet type for given values of retransmission rates and expected receive times may be calculated in advance so that once a packet retransmission rate has been determined for packets of one type, and the expected receive time has been determined, the optimal packet type may be determined immediately, for example, by using a look up table in which the results of the advance calculations have been stored, rather than calculating the optimal packet type after the retransmission rate and expected receive time have been determined, as may be performed by the embodiments illustrated in FIG. 6 and in FIG. 7. In the exemplary embodiment of method 800, for example, a family of transition tables may be calculated in advance and stored in a wireless communication device, to be referred to by the device in determining the optimal packet type for transmission during communication. Method 800 may be implemented, for example, in software loaded in a memory in a wireless communication device—such as Bluetooth™ wireless communication device 100. Method 800 may also be implemented, for example, in hardware, such as a DSP module, contained, for example, in link controller 104 or in link manager 106.

Exemplary method 800 may include steps 802, 804, 806, 808, 810, and 812, which describe portions of method 800 for purposes of conveniently illustrating method 800 according to an embodiment, but which do not necessarily uniquely characterize method 800. In other words, method 800 could be implemented by different steps in different orders from that shown in FIG. 8 and still achieve the partitioning of data into packets of different types for a wireless communication device in accordance with the invention. Exemplary method 800 is illustrated with reference to the example described above and illustrated by FIG. 5.

Figure 9A:
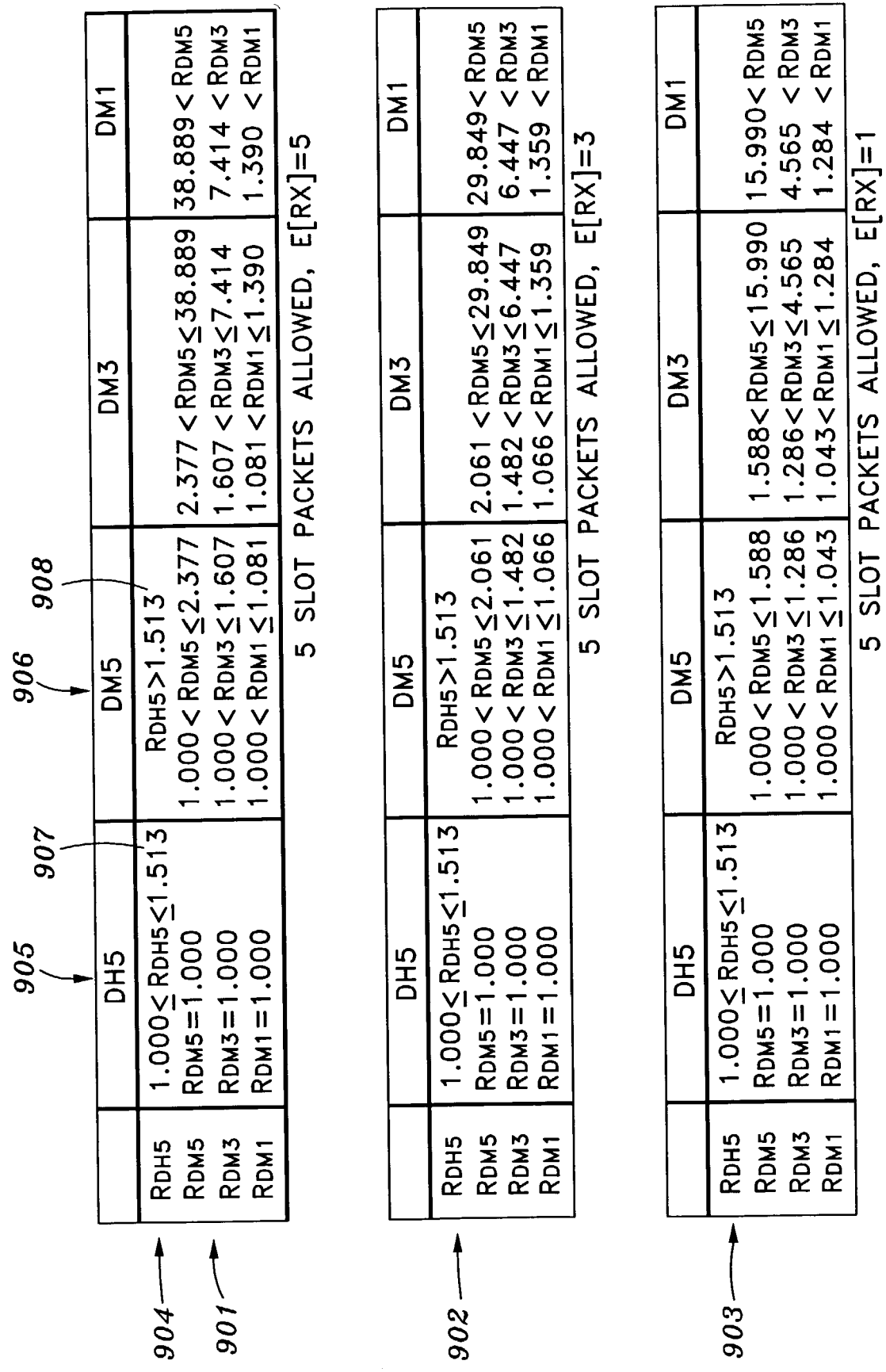
Figure 9B:
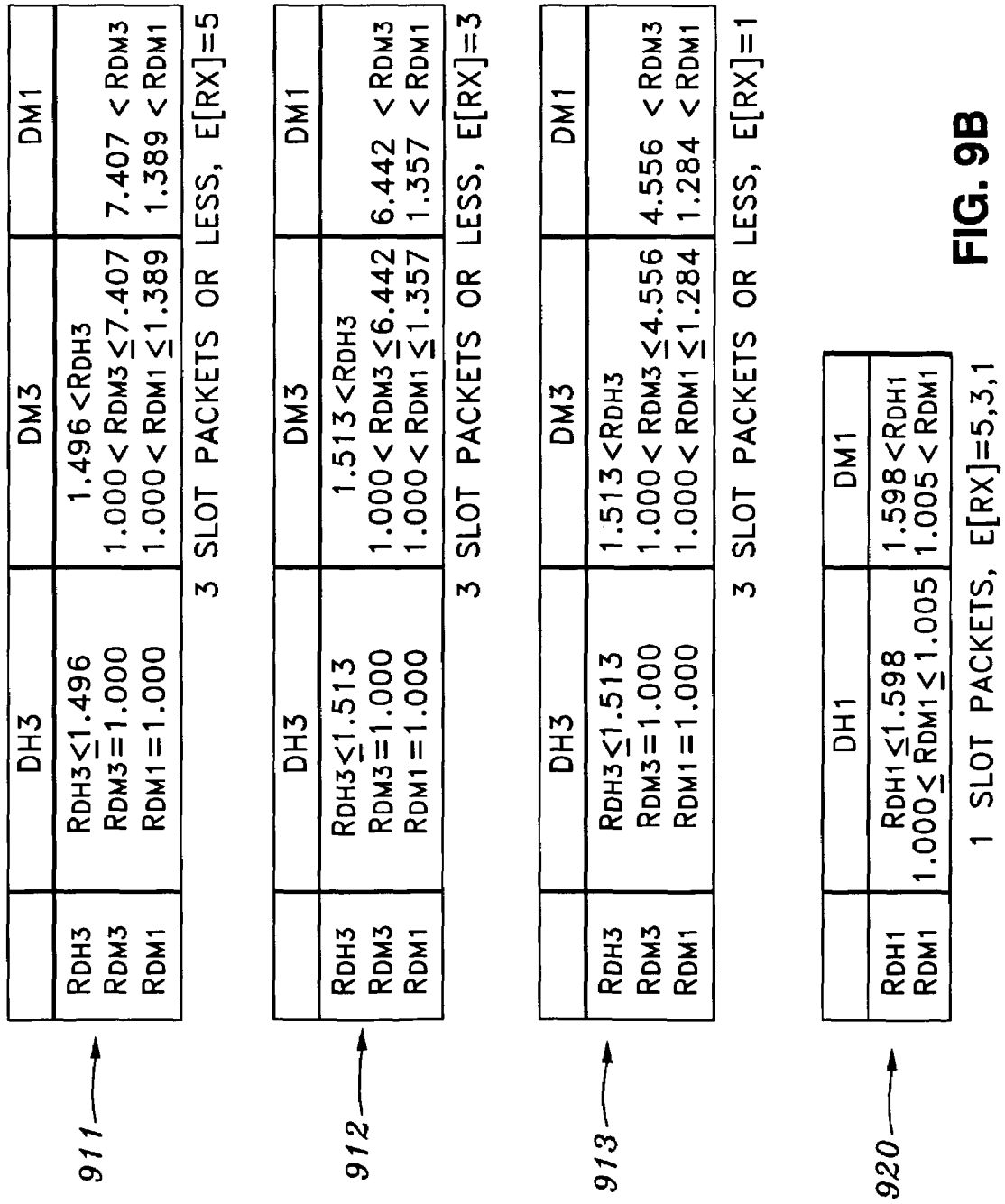

Method 800 may begin with step 802, in which a number of transition tables—such as tables 901, 902 and 903 shown in FIG. 9A, tables 911, 912, 913 and 920 shown in FIG. 9B, tables 931, 932 and 933 shown in FIG. 9C, and tables 941, 942 and 943 shown in FIG. 9D—may be computed. Each table may be computed based on the assumption of a given expected receive time value for expected receive time E[(RX)] and for a set of allowed packet types. For example, table 901 may be calculated based on the assumption that expected receive time E[(RX)]=5 time slots, table 902 may be calculated based on the assumption that expected receive time E[(RX)]=3 time slots, and table 903 may be calculated based on the assumption that expected receive time E[(RX)]=1 time slot. Thus, tables 901, 902, and 903 may be considered to form a family that may be used for any measured value of expected receive time E[(RX)], for example, when all the six packet types can be used. For example, when all six packet types can be used, the set of allowed packet types may be the set consisting of the packet types DM1, DM3, DM5, DH1, DH3, and DH5. A particular table may be chosen from the family according to which given expected receive time value is closest to the actual expected receive time E[(RX)] that is measured on packets being transmitted during communication using a wireless communication device—such as Bluetooth™ wireless communication device 100. Thus, for example, if the actual expected receive time E[(RX)]=1.9 time slots, table 903 may be used, whereas if the actual expected receive time E[(RX)]=2.1 time slots, table 902 may be used.

Similarly, tables 911, 912, and 913 may be considered to form a family that may be used for any measured value of expected receive time E[(RX)], for example, when any packet type of length three slots or less is allowed to be used. For example, when packet types of three slots or less (equivalently, less than 5 slots) are allowed to be used, the set of allowed packet types may be the set consisting of the packet types DM1, DM3, DH1, and DH3. Likewise, table 920 may be considered to form a family that may be used for any measured value of expected receive time E[(RX)], for example, when any of the two packet types DM1 and DH1 are to be used. Also, tables 931, 932, and 933 may be considered to form a family that may be used for any measured value of expected receive time E[(RX)], for example, when any of the DM packet types are allowed to be used. For example, when any of the DM packet types are allowed to be used, the set of allowed packet types may be the set consisting of the packet types DM1, DM3, and DM5. Similarly, tables 941, 942, and 943 may be considered to form a family that may be used for any measured value of expected receive time E[(RX)], for example, when any of the DM packets of length less than or equal to 3 slots are allowed to be used. For example, when any of the DM packet types of length three slots or less are allowed to be used, the set of allowed packet types may be the set consisting of the packet types DM1 and DM3.

Referring to FIGS. 9A, 9B, 9C, and 9D, and in particular to transition table 901 as an illustrative example, each row of a transition table corresponds to the type of packet currently being transmitted, for example, during communication using a wireless communication device—such as Bluetooth™ wireless communication device 100. So, for example, first row 904 of transition table 901 may correspond to packet type DH5, as indicated by the labeling of row 904 at the left side of transition table 901. In contrast, each column of a transition table corresponds to the type of packet that should be transmitted, i.e., transitioned to, in order to achieve higher data throughput, i.e., a minimal value of $E_k/L_k$ among all the packet types k being transmitted. So, for example, first column 905 of transition table 901 may correspond to packet type DH5, as indicated by the labeling of column 905 at the top of transition table 901, and second column 906 of transition table 901 may correspond to packet type DM5, as indicated by the labeling of column 906 at the top of transition table 901.

Each cell entry of a transition table may specify a condition for determining whether a transition from the packet type corresponding to the row of the cell entry to the packet type corresponding to the column of the cell entry should be made in order to achieve higher data throughput. For example, cell entry 907, "$1.000<=R_{DH5}<=1.513$" specifies a condition that if the current retransmission rate for packets of a transmitted packet's type, in this example DH5, is between 1.000 and 1.513, also referred to as the transition value, then a transition should be made from packets of type DH5 (corresponding to the row 904 of cell entry 907) to packets of type DH5 (corresponding to the column 905 of cell entry 907). In other words, if the condition is satisfied in this case, the packets being transmitted are the best type and no change of packet type should be made.

As a second example, cell entry 908, "$1.513<R_{DH5}$" specifies a condition that if the current retransmission rate for packets of a transmitted packet's type, in this example DH5 is greater than 1.513, also referred to as the transition value, then a transition should be made from packets of type DH5 (corresponding to the row 904 of cell entry 908) to packets of type DM5 (corresponding to the column 906 of cell entry 908). In other words, if the condition is satisfied in this case, the packets being transmitted are not the best type and a change of packet type should be made from packets of type DH5 to packets of type DM5.

Continuing with step 802 of method 800, and illustrating step 802 with the second example just described, the transition value 1.513 may be determined, for example, by calculating a number of trial values of $E_k/L_k$ for all allowed packet types, using a number of trial retransmission rate values $R_k$ for allowed packet types. It should be noted that the calculations of $E_k$, which may be similar to those described above, may depend on the value of the given expected receive time E[(RX)], which, in this example, is the given expected receive time E[(RX)]=5 slots for table 901. So, for example, calculations may be made of $E_{DH5}/L_{DH5}$ using values for $R_{DH5}$ of 1.512, 1.513, and 1.514 and calculations may also be made of $E_k/L_k$ for other allowed k, using values for $R_k$ corresponding to trial values of $R_{DH5}$. Then, the transition value may be selected based on comparison of the trial values of $E_{DH5}/L_{DH5}$ with the trial values of $E_k/L_k$. In this case, for example, the transition value may be selected as the terminal value of the range of trial retransmission rates for which $E_{DM5}/L_{DM5}<E_{DH5}/L_{DH5}$. For example, it may be that $E_{DM5}/L_{DM5}<E_{DH5}/L_{DH5}$ for the values $R_{DH5}=1.514$ and greater, but not for the values 1.512 and 1.513, and therefore 1.513 is the terminal value of the range for which $E_{DM5}/L_{DM5}<E_{DH5}/L_{DH5}$ and so 1.513 is selected as the transition value for cell entry 908 of table 901. Similarly, 1.513 is selected as the transition value for cell entry 907 of table 901. Likewise, each transition value for each cell entry of each of the transition tables shown in FIGS. 9A and 9B may be determined in a similar manner. Thus, each transition table embodies a correspondence between retransmission rate values and optimal packet types through the transition values contained in the transition table.

Figure 10:
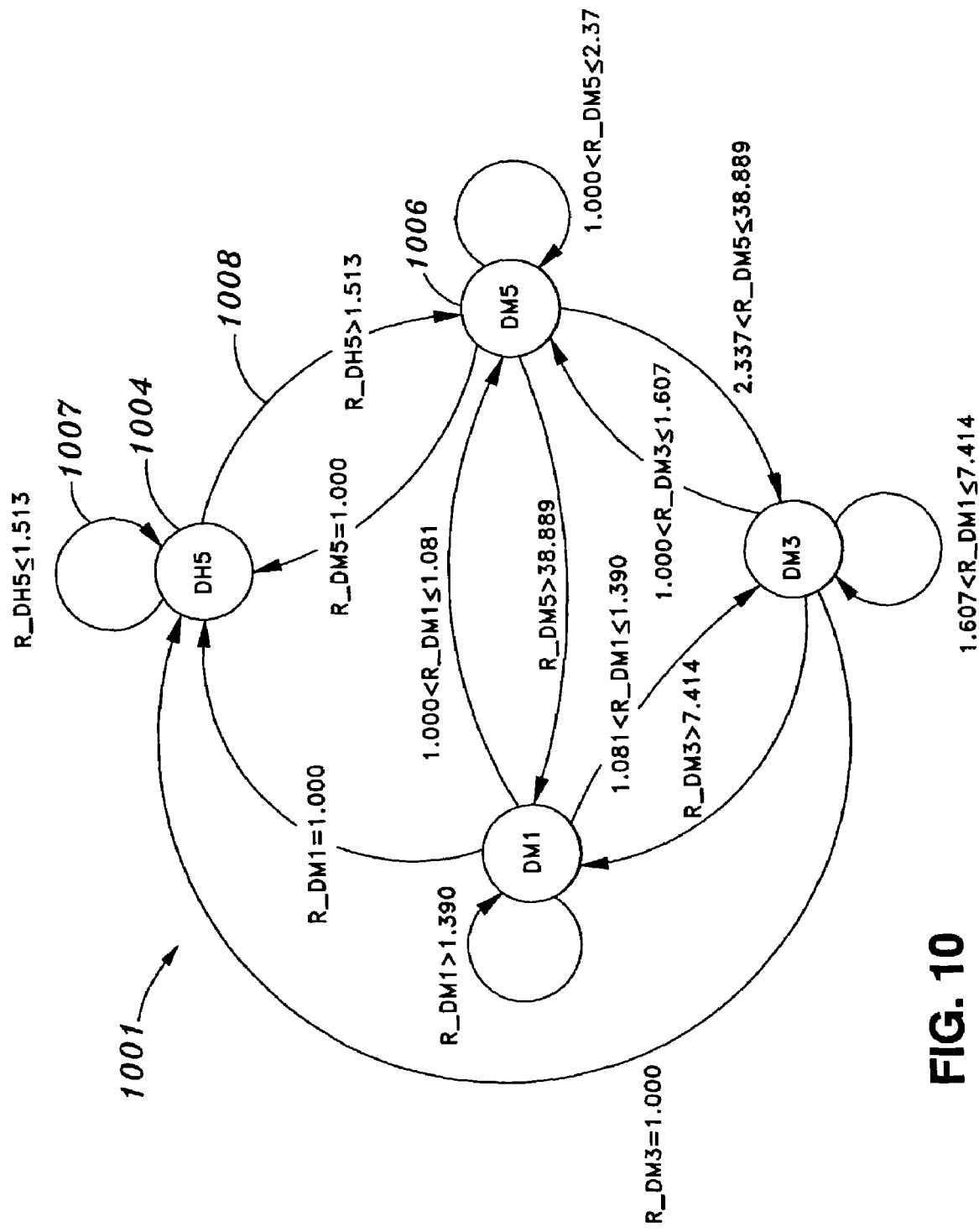
FIG. 10 is a state transition diagram corresponding to the first transition table specification shown in FIG. 9A for a partition algorithm, according to an embodiment of the present invention.

The transition algorithm specified by each transition table, such as transition table 901, may alternatively be specified by a state transition diagram, such as state transition diagram 1001, shown in FIG. 10. State transition diagram 1001, shown in FIG. 10, provides an alternative specification, as known in the art, for the specification of the transition algorithm specified by table 901. For example, state 1004 may correspond to both row 904 and column 905 of table 901. State transition 1007 may correspond to cell entry 907 of table 901. Thus, state transition 1007 represents the transition of cell entry 907 between DH5 and DH5 as an arrow from state 1004 back to state 1004 and is labeled with a label identical to that of cell entry 907. Also, for example, state 1004 may correspond to row 904 and state 1006 may correspond to column 906 of table 901. State transition 1008 may correspond to cell entry 908 of table 901. Thus, state transition 1008 represents the transition of cell entry 908 between DH5 and DM5 as an arrow from state 1004 to state 1006 and is labeled with a label identical to that of cell entry 908. Thus, each of the cell entries of table 901 may be represented by a state transition of state transition diagram 1001. Similarly, each of the transition tables shown in FIGS. 9A and 9B may be represented by a state diagram that specifies the same transition algorithm as the represented transition table.

Method 800 may continue with step 804 in which the actual expected receive time E[(RX)] may be determined by, for example, keeping track in a microprocessor of receive times RX—such as receive time 516 shown in FIG. 5—and calculating a running average, as described above, while communication using a wireless communication device—such as Bluetooth™ wireless communication device 100—is taking place.

Method 800 may continue with step 806 in which a transition table may be selected from a family of transition tables. For example, a particular table may be chosen from the family according to which given expected receive time value—used to compute the table—is closest to the actual expected receive time E[(RX)] that is determined from packets being received during communication using a wireless communication device—such as Bluetooth™ wireless communication device 100. Thus, for example, if the actual expected receive time E[(RX)]=4.1 time slots, table 901 may be selected, whereas if the actual expected receive time E[(RX)]=3.9 time slots, table 902 may be selected. The family of transition tables that has to be selected is decided by which packets we are allowed to transmit. For example, if we are allowed to transmit all packet types, we would have to choose from tables 901, 902 or 903. However, if we are allowed only packets for which $(TX)_k <= 3$ slots and 'DM' type packets only, we choose the family of tables comprising 941, 942 and 943.

Method 800 may continue with step 808 in which a current retransmission rate $R_k$ for packets of a transmitted packet's type, i.e., a single type k, may be measured by keeping a separate count of the total number of transmissions of packets of the transmitted packet's type and another separate count of the number of successful transmissions of packets of the transmitted packet's type, and dividing the total number of transmissions of packets of the transmitted packet's type by the number of successful transmissions of packets of the transmitted packet's type to compute the retransmission rate $R_k$ for packets of the transmitted packet's type. For example, k may be chosen as the type of packet that is currently being transmitted during communication using a wireless communication device—such as Bluetooth™ wireless communication device 100.

Method 800 may continue with step 810 in which the current retransmission rate $R_k$ for packets of a transmitted packet's type, determined at step 808, is compared to the appropriate transition values in the selected transition table, selected at step 806. The appropriate transition values are those in the row of the transition table corresponding to the type k of the packets currently being transmitted, for example, during communication using a wireless communication device—such as Bluetooth™ wireless communication device 100. So, for example, if the currently transmitted packets are of type DH5, and the selected transition table is table 901, then the current retransmission rate $R_k = R_{DH5}$ may be compared to the transition value 1.513 from the first row 904, corresponding to type DH5, of table 901.

Continuing with the same example, if the current retransmission rate $R_{DH5}$ is less than 1.513, method 800 may continue at step 812 by selecting DH5 as the optimum packet type according to selected transition table 901 and continue partitioning payload data, as known in the art, into packets of type DH5. If the current retransmission rate $R_{DH5}$ is greater than 1.513, method 800 may continue at step 812 by selecting DM5 as the optimum packet type according to selected transition table 901 and continue partitioning payload data, as known in the art, into packets of type DM5.

Method 800 may continue to be executed, for example, after completion of step 812 so that steps 804, 806, 808, 810, and 812 continue to be performed during communication using wireless communication device 100. Thus, the values of retransmission rates may be continually updated at step 808; expected receive time may be continually updated at step 804; the selections and comparisons at steps 806 and 810 may be continually updated; and an optimum packet type may be reselected at step 812 as conditions may change during communication using wireless communication device 100.

EXAMPLE ONE

Let the length of the higher layer packet be L bytes. Let $L_k$ be the length in bytes of a baseband packet of type k; $k \in \{1, \ldots, 6\}$. Let $N_k$ represent the number of packets of type k that will be used to transmit the upper layer packet. All combinations of baseband packets that completely transmit the higher layer packet should satisfy:

$$\Sigma_k N_k L_k >= L \quad (1)$$

The >=sign in the above equation represents the nearest packet boundary >=L. Let the distribution vector $D = \{N_1, N_2, \ldots, N_6\}$ represent a combination that completely transmits the higher layer packet.

Let $T_k$ represent the time to transmit a packet of type k and receive an ACK/NAK in response. The transmit time (TX) is either 1; 3 or 5 slots depending on the packet type. The ACK/NAK could be piggy-backed on a (RX)=1; 3 or 5 slot receive packet. So, $T_k$ is:

$$T_k = (TX)_k + E[(RX)] \quad (2)$$

where E[ ] represents the expectation operation. $T_k$ is therefore the total expected time to transmit once and receive an ACK/NAK. Let $R_k$ be the expected number of times we need to transmit a packet of type k to get it across.

$$R_k = (\text{number of transmissions/number of successful transmissions})_k \quad (3)$$

Then, $T_k R_k$ is the expected time to transmit a packet of type k. Let us represent this by $E_k$. The total time required to transmit the combination represented by D is:

$$\Sigma_k N_k E_k \quad (4)$$

The maximum throughput will be achieved for that D for which Equation (4) evaluates to the least value. We therefore need to find this D, i.e.

$$\min_D \Sigma_k N_k E_k \quad (5)$$

We next propose a solution to Equation (5), under the constraint represented by Equation (1).

Solution

Let $N_k = X_k^2$ to ensure $N_k > 0$. Also assume for the time being that $N_k$ is not an integer. Re-writing $X_k^2$ for $N_k$, we have, $$\min \Sigma_k X_k^2 E_k \qquad (6)$$

such that $$\Sigma_k X_k^2 L_k = L \qquad (7)$$

The equality sign holds in Equation (7) since $X_k^2$ is no longer an integer. Let the index m be such that $$E_m/L_m <= E_k/L_k \forall k \qquad (8)$$

Then, rewriting Equation (7), $$X_m^2 L_m = L - \sum_{k \neq m} X_k^2 L_k$$

$$\Rightarrow X_m^2 = L/L_m - \sum_{k \neq m} X_k^2 L_k / L_m$$

Considering Equation (6), $$\sum_k X_k^2 E_k = X_m^2 E_m + \sum_{k \neq m} X_k^2 E_k \qquad (9)$$

$$= \left[ L/L_m - \sum_{k \neq m} X_k^2 L_k / L_m \right] E_m + \sum_{k \neq m} X_k^2 E_k$$

$$= E_m \left[ L/L_m - \sum_{k \neq m} X_k^2 [E_k/E_m - L_k/L_m] \right]$$

We need to choose $X_k$, $k \neq m$ such that the LHS of Equation (9) is minimized. Looking at the coefficients of $X_k^2$ on the RHS we find that they are always $>= 0$ due to Equation (8). So the LHS is minimized only when $X_k = 0$ $\forall k \neq m$. This implies, $$N_k = 0 \; \forall k \neq m$$

$$N_m = L/L_m \qquad (10)$$

In the above equation, $N_m$ is not an integer. But in practice, we need it to be.

L represents the size of a buffer which would store the data before the data is sent off to the baseband for transmission. So, at peak rate, the buffer would be continuously filled even as the baseband empties it. Hence, the fractional portion of $N_m$ is not important to us. We would always have enough data to fill up whole packets of type m. In Equation (10), we could consider L as a multiple of $L_m$.

Therefore in practice, we would just choose that packet type k whose $E_k/L_k$ value is the least.

EXAMPLE TWO

The algorithm selects the best packet type, given the retransmission vector R. So, we would transmit only that packet type until the next time we refresh the retransmission vector. This means that we would not have any information about the retransmission rates of packet types other than the one we chose earlier. This section presents a method to compute the retransmission rates of other packet types, given the retransmission rate of one.

The approach is this: Compute Packet Error Rate ($P_k$) from ($R_k$), and Bit Error Rate (BER) from $P_k$. From BER compute $R_i \; \forall i \neq k$.

The DSP gives the processor two numbers, the number of times it has transmitted a given packet type ($t_k$) and the number of times it had to retransmit that packet type ($r_k$). So we would compute $$R_k = t_k/(t_k - r_k)$$

$$P_k = r_k/t_k$$

$$\text{So, } R_k = (1 - P_k)^{-1} \qquad (11)$$

The Bluetooth baseband packet has two sections, the header and the payload. The header is coded with a ⅓ repetition code in all packets. The payload is coded with a ⅔ Hamming code in the DM packets and is uncoded in the DH packets. We relate $P_k$ to the probability of header failure $p^{hdr}$ and to the probability of payload failure $p_k^{pyld}$ as $$P_k = 1 - (1 - p^{hdr})(1 - p_k^{pyld}) \qquad (12)$$

The header is 18 bits long and is coded with a ⅓ repetition code, taking the total to 54 bits. Since, the repetition code can correct all single bit errors, the probability of a 3 bit coded block being decoded correctly is $(1-BER)^3 + 3BER(1-BER)^2$. So, $$p^{hdr} = 1 - [(1 - BER)^3 + 3BER(1 - BER)^2]^{18} \qquad (13)$$

$$= 1 - (1 - BER)^{36}(1 + 2BER)^{18}$$

Calculate the $p_k^{pyld}$ for uncoded packets as, $$p_k^{pyld} = 1 - (1 - BER)^{bk} \qquad (14)$$

where bk is the number of bits in the payload, inclusive of the payload header and the CRC bits.

In coded packets, the coding replaces a 10 bit data sequence with a 15 bit coded word. The code corrects all single bit errors in the 15 bit sequence. So, $p_k^{pyld}$ for coded packets is $$p_k^{pyld} = 1 - [(1 - BER)^{15} + 15BER(1 - BER)^{14}]^{\lceil bk/10 \rceil} \qquad (15)$$

$$= 1 - (1 - BER)^{14 \lceil bk/10 \rceil}(1 + 14BER)^{\lceil bk/10 \rceil}$$

So, from Equations (12), (13), (14), the packet error rate for uncoded packets becomes $$P_k^{uncoded} = 1 - (1 - BER)^{36}(1 + 2BER)^{18}(1 - BER)^{bk} \qquad (16)$$

From Equations (12), (13), (15), the packet error rates of coded packets becomes $$P_k^{coded} = 1 - (1 - BER)^{36}(1 + 2BER)^{18}(1 - BER)^{14 \lceil bk/10 \rceil}(1 + 14BER)^{\lceil bk/10 \rceil} \qquad (17)$$

Relating the retransmission rates to the packet error rates (Equation (11)) and using Equation (16), we get, for uncoded packets, $$R_k = (1 - BER)^{-36}(1 + 2BER)^{-18}(1 - BER)^{-bk} \qquad (18)$$

Using Equation (11) and Equation (17) for coded packets, $$R_k = (1 - BER)^{-36}(1 + 2BER)^{-18}(1 - BER)^{-14 \lceil bk/10 \rceil}(1 + 14BER)^{-\lceil bk/10 \rceil} \qquad (19)$$

So, given $R_k$ of one packet, we can calculate the BER from it and from BER calculate $R_i$ $\forall$ i≠k.

It should be understood, of course, that the foregoing relates to preferred embodiments of the invention and that modifications may be made without departing from the spirit and scope of the invention as set forth in the following claims.

The invention claimed is:

1. A method for partitioning data into packets, comprising steps of:
   determining an expected successful transmit time $E_k$ for packets of length $L_k$ for each packet type k of a plurality of packet types, said expected successful transmit time $E_k$ being determined based on an expected number of transmission and retransmissions for each packet of type k;
   choosing a packet type from among said plurality of packet types for which a value of ratio $E_k/L_k$ is a minimum; and
   partitioning said data into packets of said chosen packet type.

2. The method of claim 1, further comprising steps of:
   counting a total number of transmissions of packets of type k;
   counting a number of successful transmissions of packets of type k;
   computing a retransmission rate $R_k$, for packets of type k, as said total number of transmissions divided by said number of successful transmissions; and
   using said retransmission rate $R_k$ in said step of determining said expected successful transmit time $E_k$.

3. The method of claim 1, wherein each packet of type k has a transmit time $(TX)_k$, the method further comprising steps of:
   determining an expected receive time $E[(RX)]$;
   computing a total expected acknowledged transmit time $T_k$ as $T_k=(TX)_k+E[(RX)]$; and
   using said total expected acknowledged transmit time $T_k$ in said step of determining said expected successful transmit time $E_k$.

4. The method of claim 1, wherein k is selected from a set consisting of 1, 2, 3, 4, 5, 6 and said plurality of packet types comprises packet types DM1, DH1, DM3, DH3, DM5, DH5.

5. A method for partitioning data into packets, comprising steps of:
   determining a retransmission rate for packets of a single type;
   computing a bit error rate (BER) from said retransmission rate for packets of said single type;
   computing, using said BER, a retransmission rate $R_k$, for packets of length $L_k$ for each packet type k of a plurality of packet types;
   computing, using said retransmission rate $R_k$, an expected successful transmit time $E_k$, for packets of each type k;
   choosing a packet type from among said plurality of packet types for which a value $E_k/L_k$ is a minimum; and
   partitioning said data into packets of said chosen packet type.

6. The method of claim 5, further comprising steps of:
   counting a total number of transmissions of packets of said single type;
   counting a number of successful transmissions of packets of said single type; and
   computing said retransmission rate for packets of said single type as said total number of transmissions divided by said number of successful transmissions.

7. The method of claim 5, wherein each packet of type k has a transmit time $(TX)_k$, the method further comprising steps of:
   determining an expected receive time $E[(RX)]$;
   computing a total expected acknowledged transmit time $T_k$ as $T_k=(TX)_k+E[(RX)]$; and
   computing said expected successful transmit time $E_k$ as $T_k$ multiplied by $R_k$.

8. The method of claim 5, wherein said plurality of packet types comprises packet types DM1, DH1, DM3, DH3, DM5, and DH5.

9. The method of claim 5, wherein said plurality of packet types comprises packet types DM1, DM3, and DM5.

10. The method of claim 5, wherein said plurality of packet types comprises packet types DM1, DM3, DH1, and DH3.

11. The method of claim 5, wherein said plurality of packet types comprises packet types DM1 and DM3.

12. The method of claim 5, wherein said plurality of packet types comprises packet types DM1 and DH1.

13. A wireless communication device comprising:
   a processor that determines an expected successful transmit time $E_k$ for packets of length $L_k$ for each packet type k of a plurality of packet types, said expected successful transmit time $E_k$ being determined based on an expected number of transmission and retransmissions for each packet of type k;
   chooses a packet type from among said plurality of packet types for which a value of ratio $E_k/L_k$ is a minimum; and
   partitions said data into packets of said chosen packet type.

14. The wireless communication device of claim 13 wherein:
   said processor counts a total number of transmissions of packets of type k;
   counts a number of successful transmissions of packets of type k;
   computes a retransmission rate $R_k$, for packets of type k, as said total number of transmissions divided by said number of successful transmissions; and
   uses said retransmission rate $R_k$ to determine said expected successful transmit time $E_k$.

15. The wireless communication device of claim 13 wherein:
   each packet of type k has a transmit time $(TX)_k$; and
   said processor determines an expected receive time $E[(RX)]$;
   computes a total expected acknowledged transmit time $T_k$ as $T_k=(TX)_k+E[(RX)]$; and
   uses said total expected acknowledged transmit time $T_k$ to determine said expected successful transmit time $E_k$.

16. The wireless communication device of claim 13 wherein k is selected from a set consisting of 1, 2, 3, 4, 5, 6 and said plurality of packet types comprises packet types DM1, DH1, DM3, DH3, DM5, DH5.

17. A wireless communication system comprising:
   at least one wireless communication device having
   a processor that determines an expected successful transmit time $E_k$ for packets of length $L_k$ for each packet type k of a plurality of packet types, said expected successful transmit time $E_k$ being determined based on an expected number of transmission and retransmissions for each packet of type k;
   chooses a packet type from among said plurality of packet types for which a value of ratio $E_k/L_k$ is a minimum; and
   partitions data into packets of said chosen packet type.

18. The wireless communication system of claim 17 wherein:
   said processor counts a total number of transmissions of packets of a single type;
   counts a number of successful transmissions of packets of said single type;

computes a retransmission rate for packets of said single type as said total number of transmissions divided by said number of successful transmissions;

computes a bit error rate (BER) from said retransmission rate for packets of said single type;

computes, using said BER, a retransmission rate $R_k$, for packets of each type k; and uses said retransmission rate $R_k$ to determine said expected successful transmit time $E_k$ for packets of each type k.

19. The wireless communication system of claim 18 wherein:

each packet of type k has a transmit time $(TX)_k$; and said processor determines an expected receive time E[(RX)];

computes a total expected acknowledged transmit time $T_k$ as $T_k=(TX)_k+E[(RX)]$; and computes said expected successful transmit time $E_k$ as $T_k$ multiplied by $R_k$.

20. The wireless communication system of claim 17 wherein said plurality of packet types comprises packet types DM1, DH1, DM3, DH3, DM5, and DH5.

21. The wireless communication system of claim 17 wherein said plurality of packet types comprises packet types DM1, DM3, DH1, and DH3.

22. The wireless communication system of claim 17 wherein said plurality of packet types comprises packet types DM1 and DH1.

23. The wireless communication system of claim 17 wherein said plurality of packet types comprises packet types DM1, DM3, and DM5.

24. The wireless communication system of claim 17 wherein said plurality of packet types comprises packet types DM1 and DM3.

25. A wireless communication system comprising:

a first wireless communication device;

a second wireless communication device that communicates with said first wireless communication device;

wherein at least one of said first wireless communication device and said second wireless communication device comprises a processor that determines an expected successful transmit time $E_k$ for packets of length $L_k$ for each packet type k of a plurality of packet types, said expected successful transmit time $E_k$ being determined based on an expected number of transmission and retransmissions for each packet of type k, chooses a packet type from among said plurality of packet types for which a value of ratio $E_k/L_k$ is a minimum; and partitions data into packets of said chosen packet type.

26. The wireless communication system claim 25, wherein:

said processor counts a total number of transmissions of packets of a transmitted packet type; counts a number of successful transmissions of packets of said transmitted packet type; computes a current retransmission rate $R_k$ for packets of said transmitted packet type, as said total number of transmissions divided by said number of successful transmissions; compares said current retransmission rate $R_k$ for said transmitted packet type to a transition value in a transition table; and chooses, according to said transition table, said chosen packet type for which the value of the ratio $E_k/L_k$ is a minimum.

27. A wireless communication device comprising:

a processor that determines a retransmission rate for packets of a transmitted packet type;

determines an actual expected receive time E[(RX)];

selects a transition table from a plurality of transition tables based on said actual expected receive time E[(RX)];

chooses a packet type from among a set of allowed packet types based on said selected transition table and said retransmission rate; and partitions data into packets of said chosen packet type, wherein:

each transition table of said plurality of transition tables embodies a correspondence between retransmission rate values and packet types to be chosen, said correspondence depends on one of a plurality of given expected receive time values, and said selected transition table depends on one of said plurality of given expected receive time values that is closest to said actual expected receive time E[(RX)].

28. The wireless communication device of claim 27 wherein said plurality of given expected receive time values comprises 1 time slot, 3 time slots, and 5 time slots.

29. The wireless communication device of claim 28 wherein said chosen packet type is selected from said set of allowed packet types further based on said transmitted packet type k.

30. The wireless communication device of claim 29 wherein said set of allowed packet types comprises all packet types.

31. The wireless communication device of claim 29 wherein said set of allowed packet types comprises all packet types of length less than 5 slots.

32. The wireless communication device of claim 29 wherein said set of allowed packet types comprises all packet types of length equal to one slot.

33. The wireless communication device of claim 29 wherein said set of allowed packet types comprises all DM packet types.

34. The wireless communication device of claim 29 wherein said set of allowed packet types comprises all DM packet types of length less than 4 slots.

35. The wireless communication device of claim 29 wherein when said set of allowed packet types comprises all packet types of length equal to one slot:

when k=DH1, said processor chooses packet type DH1 when RDH1<=1.598 and DM1 when 1.598<RDH1; and when k=DM1, said processor chooses packet type DH1 when 1.000<=RDM1<=1.005 and DM1 when 1.005<RDM1.

36. The wireless communication device of claim 29 wherein when E[(RX)]<2.0 and said set of allowed packet types comprises all packet types of length less than 4 slots:

when k=DH3, said processor chooses packet type DH3 when RDH3<=1.513, and DM3 when 1.513<RDH3;

when k=DM3, said processor chooses packet type DH3 when 1.000=RDM3, DM3 when 1.000<RDM3<=4.556, and DM1 when 4.556<RDM3; and when k=DM1, said processor chooses packet type DH3 when 1.000=RDM1, DM3 when 1.000<RDM1<=1.284, and DM1 when 1.284<RDM1.

37. The wireless communication device of claim 29 wherein when 2.0<E[(RX)]<4.0 and said set of allowed packet types comprises all packet types of length less than 5 slots:

when k=DH3, said processor chooses packet type DH3 when RDH3<=1.513, and DM3 when 1.513<RDH3;

when k=DM3, said processor chooses packet type DH3 when 1.000=RDM3, DM3 when 1.000<RDM3<=6.442, and DM1 when 6.442<RDM3; and when k=DM1, said processor chooses packet type DH3 when 1.000=RDM1, DM3 when 1.000<RDM1<=1.357, and DM1 when 1.357<RDM1.

38. The wireless communication device of claim 29 wherein when 4.0<E[(RX)] and said set of allowed packet types comprises all packet types of length less than 5 slots:

when k=DH3, said processor chooses packet type DH3 when RDH3<=1.496, and DM3 when 1.496<RDH3;

when k=DM3, said processor chooses packet type DH3 when 1.000=RDM3, DM3 when 1.000<RDM3<=7.407, and DM1 when 7.407<RDM3; and when k=DM1, said processor chooses packet type DH3 when 1.000=RDM1, DM3 when 1.000<RDM1<=1.389, and DM1 when 1.389<RDM1.

39. The wireless communication device of claim 29 wherein when E[(RX)]<2.0 and said set of allowed packet types comprises all packet types:

when k=DH5, said processor chooses packet type DH5 when 1.000<RDH5<=1.513, and DM5 when 1.513<RDH5;

when k=DM5, said processor chooses packet type DH5 when 1.000=RDM5, DM5 when 1.000<RDM5<=1.588, DM3 when 1.588<RDM5<=15.990, and DM1 when 15.990<RDM5;

when k=DM3, said processor chooses packet type DH5 when 1.000=RDM3, DM5 when 1.000<RDM3<=1.286, DM3 when 1.286<RDM3<=4.565, and DM1 when 4.565<RDM3; and when k=DM1, said processor chooses packet type DH5 when 1.000=RDM1, DM5 when 1.000<RDM1<=1.043, DM3 when 1.043<RDM1<=1.284, and DM1 when 1.284<RDM1.

40. The wireless communication device of claim 29 wherein when 2.0<E[(RX)]<4.0 and said set of allowed packet types comprises all packet types:

when k=DH5, said processor chooses packet type DH5 when 1.000<RDH5<=1.513, and DM5 when 1.513<RDH5; when k=DM5, said processor chooses packet type DH5 when 1.000=RDM5, DM5 when 1.000<RDM5<=2.061, DM3 when 2.061<RDM5<=29.849, and DM1 when 29.849<RDM5;

when k=DM3, said processor chooses packet type DH5 when 1.000=RDM3, DM5 when 1.000<RDM3<=1.482, DM3 when 1.482<RDM3<=6.447, and DM1 when 6.447<RDM3; and when k=DM1, said processor chooses packet type DH5 when 1.000=RDM1, DM5 when 1.000<RDM1<=1.066, DM3 when 1.066<RDM1<=1.359, and DM1 when 1.359<RDM1.

41. The wireless communication device of claim 29 wherein when 4.0<E[(RX)] and said set of allowed packet types comprises all packet types:

when k=DH5, said processor chooses packet type DH5 when 1.000<RDH5<=1.513, and DM5 when 1.513<RDH5;

when k=DM5, said processor chooses packet type DH5 when 1.000=RDM5, DM5 when 1.000<RDM5<=2.377, DM3 when 2.377<RDM5<=38.889, and DM1 when 38.889<RDM5;

when k=DM3, said processor chooses packet type DH5 when 1.000=RDM3, DM5 when 1.000<RDM3<=1.607, DM3 when 1.607<RDM3<=7.414, and DM1 when 7.414<RDM3; and when k=DM1, said processor chooses packet type DH5 when 1.000=RDM1, DM5 when 1.000<RDM1<=1.081, DM3 when 1.081<RDM1<=1.390, and DM1 when 1.390<RDM1.

42. The wireless communication device of claim 29 wherein when E[(RX)]<2.0 and said set of allowed packet types comprises all DM packet types of length less than 5 slots:

when k=DM3, said processor chooses packet type DM3 when 1.000<=RDM3<=4.556 and DM1 when 4.556<RDM3; and when k=DM1, said processor chooses packet type DM3 when 1.000<=RDM1<=1.284 and DM1 when 1.284<RDM1.

43. The wireless communication device of claim 29 wherein when 2.0<E[(RX)]<4.0 and said set of allowed packet types comprises all DM packet types of length less than 5 slots:

when k=DM3, said processor chooses packet type DM3 when 1.000<=RDM3<=6.442 and DM1 when 6.442<RDM3; and when k=DM1, said processor chooses packet type DM3 when 1.000<=RDM1<=1.359 and DM1 when 1.359<RDM1.

44. The wireless communication device of claim 29 wherein when 4.0<E[(RX)] and said set of allowed packet types comprises all DM packet types of length less than 5 slots:

when k=DM3, said processor chooses packet type DM3 when 1.000<=RDM3<=7.407 and DM1 when 7.407<RDM3; and when k=DM1, said processor chooses packet type DM3 when 1.000<=RDM1<=1.389 and DM1 when 1.389<RDM1.

45. The wireless communication device of claim 29 wherein when E[(RX)]<2.0 and said set of allowed packet types comprises all DM packet types:

when k=DM5, said processor chooses packet type DM5 when 1.000<=RDM5<=1.588, DM3 when 1.588<RDM5<=15.990, and DM1 when 15.990 K RDM5;

when k=DM3, said processor chooses packet type DM5 when 1.000<=RDM3<=1.286, DM3 when 1.286<RDM3<=4.566, and DM1 when 4. 566<RDM3; and when k=DM1, said processor chooses packet type DM5 when 1.000<=RDM1<=1.043, DM3 when 1.043<RDM1<=1.284, and DM1 when 1.284<RDM1.

46. The wireless communication device of claim 29 wherein
when 2.0<E[(RX)]<4.0 and said set of allowed packet types comprises all DM packet types:
when k=DM5, said processor chooses packet type DM5 when 1.000<=RDM5<=2.061, DM3 when 2.061<RDM5<=29.849, and DM1 when 29.849<RDM5;
when k=DM3, said processor chooses packet type DM5 when 1.000<=RDM3<=1.482, DM3 when 1.482<RDM3<=6.447, and DM1 when 6.447<RDM3; and
when k=DM1, said processor chooses packet type DM5 when 1.000<=RDM1<=1.066, DM3 when 1.066<RDM1<=1.359, and DM1 when 1.359<RDM1.

47. The wireless communication device of claim 29 wherein
when 4.0<E[(RX)] and said set of allowed packet types comprises all DM packet types:
when k=DM5, said processor chooses packet type DM5 when 1.000<=RDM5<=2.377, DM3 when 2.377<RDM5<=38.889, and DM1 when 38.889<RDM5;
when k=DM3, said processor chooses packet type DM5 when 1.000<=RDM3<=1.607, DM3 when 1.607RDM3<=7.414, and DM1 when 7.414<RDM3; and
when k=DM1, said processor chooses packet type DM5 when 1.000<=RDM1<=1.081, DM3 when 1.081<RDM1<=1.391, and DM1 when 1.391<RDM1.

48. A wireless communication device comprising:
means for determining an expected successful transmit time $E_k$ for packets of length $L_k$ for each packet type k of a plurality of packet types, said expected successful transmit time $E_k$ being determined based on an expected number of transmission and retransmissions for each packet of type k;
means for choosing a packet type from among said plurality of packet types for which a value of ratio $E_k/L_k$ is a minimum; and
means for partitioning data into packets of said chosen packet type.

49. The wireless communication device of claim 48, further comprising:
means for counting a total number of transmissions of packets of type k;
means for counting a number of successful transmissions of packets of type k;
means for computing a retransmission rate $R_k$, for packets of type k, as said total number of transmissions divided by said number of successful transmissions; and
means for using said retransmission rate $R_k$ to determine said expected successful transmit time $E_k$.

50. The wireless communication device of claim 48, wherein each packet of type k has a transmit time $(TX)_k$; the wireless communication device further comprising:
means for determining an expected receive time E[(RX)];
means for computing a total expected acknowledged transmit time $T_k$ as $T_k=(TX)_k+E[(RX)]$; and
means for using said total expected acknowledged transmit time $T_k$ to determine said expected successful transmit time $E_k$.

51. The wireless communication device of claim 48 wherein k is selected from a set consisting of 1, 2, 3, 4, 5, 6 and said plurality of packet types comprises packet types DM1, DH1, DM3, DH3, DM5, DH5.

* * * * *